US005638305A

United States Patent [19]

Kobayashi et al.

[11] Patent Number: 5,638,305

[45] Date of Patent: Jun. 10, 1997

[54] VIBRATION/NOISE CONTROL SYSTEM

[75] Inventors: Toshiaki Kobayashi; Hidetaka Ozawa, both of Wako, Japan

[73] Assignee: Honda Giken Kogyo Kabushiki Kaisha, Tokyo, Japan

[21] Appl. No.: 410,273

[22] Filed: Mar. 24, 1995

[30] Foreign Application Priority Data

Mar. 25, 1994 [JP] Japan .................................... 6-079351

[51] Int. Cl.$^6$ .................................................. H04B 15/00

[52] U.S. Cl. ................................................ 364/574; 381/71

[58] Field of Search .................................... 364/574, 572, 364/424.05; 381/71, 73.1, 86, 94

[56] References Cited

U.S. PATENT DOCUMENTS

| | | | |
|---|---|---|---|
| 4,232,381 | 11/1980 | Rennick et al. | 364/574 |
| 4,435,751 | 3/1984 | Hori et al. | 364/574 |
| 5,029,118 | 7/1991 | Nakajima et al. | 364/574 |
| 5,233,540 | 8/1993 | Andersson et al. | 364/574 |
| 5,396,414 | 3/1995 | Alcone | 364/574 |
| 5,455,779 | 10/1995 | Sato et al. | 364/574 |
| 5,526,292 | 6/1996 | Hodgson et al. | 364/574 |
| 5,550,739 | 8/1996 | Hoffmann et al. | 364/424.05 |
| 5,551,649 | 9/1996 | Kaptein | 364/574 |

FOREIGN PATENT DOCUMENTS 5-265468 10/1993 Japan .

*Primary Examiner*—Vincent N. Trans
*Attorney, Agent, or Firm*—Lyon & Lyon LLP

[57] ABSTRACT

A vibration/noise control system controls vibrations and noises generated with a periodicity or a quasi-periodicity from a vibration/noise source having at least a rotating member. A self-expanding engine mount is arranged in at least one of vibration/noise transmission paths and is driven by a driving signal generated by the system. A vibration error sensor detects an error signal exhibiting a difference between the driving signal and the vibrations and noises. A reference sine wave is generated, which is superposed on a control signal for controlling the vibration/noise source, to thereby drive the self-expanding engine mount. A transfer characteristic of a portion of at least one of the vibration/noise transmission paths is identified based on the reference sine wave, a delayed sine wave delayed by a predetermined delay period M relative to the reference sine wave, and the error signal. The transfer characteristic stored is updated based on an identification signal output from an identifying filter formed by an adaptive digital filter having two taps. The predetermined delay period M is set relative to the repetition period of the reference sine wave in a range of $1/3 \geqq M \geqq 1/7$, wherein M is a real number.

29 Claims, 13 Drawing Sheets

| FIG.5 | | |
|---|---|---|
| FIG.5A | | |
| FIG.5C | FIG.5D | FIG.5B |

VIBRATION/NOISE CONTROL SYSTEM

BACKGROUND OF THE INVENTION

1. Field of the Invention

This invention relates to a vibration/noise control system, and more particularly to a vibration/noise control system which actively controls vibrations and noises generated with a periodicity or a quasi-periodicity from a rotating member and the like, to thereby reduce the vibrations and noises.

2. Prior Art

Recently, vibration/active noise control systems have intensively been developed in various fields of the industry, which are adapted to damp vibrations and noises produced from vibration/noise sources, by the use of an adaptive digital filter (hereinafter referred to as "ADF"), to thereby reduce the vibrations and noises.

These conventional vibration/active noise control systems include a vibration/noise control system proposed by Japanese Patent Application No. 5-86823 filed by the present assignee and U.S. Ser. No. 08/189,912 (now U.S. Pat. No. 5,544,080) corresponding thereto, wherein a sine wave signal having a single repetition period is generated depending on the repetition period of vibrations and noises peculiar to component parts of the vibration/noise source, and the sine wave signal and a delayed sine wave signal which is delayed in phase by a predetermined period relative to the former are input to the ADF.

In the proposed vibration/noise control system, a Wiener filter (hereinafter referred to as "the W filter") of a Finite Impulse Response (FIR) type having two taps (filtering order number) is employed as the ADF, and a rotation signal from a rotating member is detected in the form of a pulse signal whenever the rotating member rotates through a predetermined very small rotating angle (e.g. 3.6°). More specifically, in the proposed vibration/noise control system, a sine wave signal for one repetition period is generated whenever the rotating member rotates one rotation (360 degrees), and the thus generated sine wave signal and a delayed sine wave signal obtained by delaying the sine wave signal in phase by a predetermined period are input to first filter means for executing adaptive control, whereby even with the use of the ADF having two taps, the adaptive control can be achieved, enabling a reduction in the time period required for the product-sum operation to be carried out.

Further, in the proposed vibration/noise control system, the transfer characteristic of a transmission path of vibrations and noises to be controlled is stored in a table incorporated in second filter means, as results of predetermined identification processing carried out beforehand, and the transfer characteristic stored in the second filter means is read out to thereby correct a control signal for canceling the vibrations and noises. Thus, according to the proposed vibration/noise control system, the transfer characteristic which has been once stored into the second filter means is regarded and treated as a fixed characteristic during control operation of the vibration/noise control system.

Vehicles, such as automotive vehicles, in which vibrations and noises are generated with a periodicity or a quasi-periodicity are used to travel under various environments over a long time period, and hence the transfer characteristic of the vibration/noise transmission path changes depending on environments under which the vehicle travels. In particular, when vibration/noise control is carried out for a vehicle in which the engine is mounted on a so-called self-expanding engine mount, there can occur a change in the elasticity of rubber members constituting part of the engine mount due to dependency thereof on the temperature, and/or hardening of the rubber members due to aging, which causes to a change in the transfer characteristic. Further, the transfer characteristic of vibrations and noises within the compartment delicately changes depending on various factors, such as the temperature, the humidity, open/closed states of windows of the vehicle, and seating locations of passengers and the number of the passengers.

In the proposed vibration/noise control system, however, since the transfer characteristic stored in the second filter means is regarded and treated as a fixed characteristic during the vibration/noise control, it is necessary to correct the transfer characteristic for a change in the elasticity of the rubber members due to aging, etc. by means of identification processing on an occasion such as a safety checking of the vehicle. Further, it is also necessary to correct the transfer characteristic for a change in the temperature by means of a temperature sensor. However, this further requires the provision of a memory having a large capacity and temperature sensors for each rubber member, etc., resulting in a complicated identification operation as well as an increase in the number of component parts and an increase in the labor and time.

Therefore, to carry out highly accurate vibration/noise control in dependence on aging and environmental change, it is desirable that correction of the transfer characteristic of the vibration/noise transmission path should be carried out during the adaptive control. To this end, an active noise control system has been proposed, for example, by Japanese Laid-Open Patent Publication (Kokai) No. 5-265468, wherein an identifying sound corresponding to a background noise level within a predetermined space to be subjected to noise control is generated and output, and the transfer characteristic of the noise transmission path is determined based on the identifying sound and a residual noise at a predetermined location within the predetermined space, to thereby identify the transfer characteristic of the noise transmission path during execution of the noise control.

According to the proposed active noise control system, the identifying sound generated is lower in level by a predetermined amount than the background noise so that the transfer characteristic of the noise transmission path can be identified without the identifying sound being sensed by the passenger(s).

In the proposed active noise control system, to obtain highly accurate identification results, the identifying sound is required to have a good S/N ratio.

If the identifying sound is set to a higher level to increase the S/N ratio, the identifying sound is sensed by the passenger(s), to thereby give an uncomfortable feeling to the passenger(s). Therefore, the identifying sound should be set to a level as small as possible. In other words, when the proposed active noise control system is applied to an automotive vehicle, the level of the identifying sound can be increased only to a limited degree. In addition, the noise level within the compartment is large due to road noises and the like during travel of the vehicle, so that it is difficult to maintain the S/N ratio at a satisfactory level. Thus, the proposed active noise control system can achieve only a limited accuracy of identification results, and hence is incapable of performing proper noise control in response to aging change and environmental change.

Moreover, the proposed active noise control system employs an ADF having many taps, and hence requires a long time period to identify the transfer characteristic.

SUMMARY OF THE INVENTION

It is the object of the invention to provide a vibration/noise control system which is capable of identifying the transfer characteristic of a vibration/noise transmission path, in dependence on a change in the same due to aging and traveling environments, in an accurate and prompt manner.

To attain the above object, according to a first aspect of the invention, there is provided a vibration/noise control system for controlling vibrations and noises generated with a periodicity or a quasi-periodicity from a vibration/noise source having at least one rotating member, comprising:

- timing pulse signal-detecting means for detecting at least one timing pulse signal exhibiting a period of vibrations and noises peculiar to at least one component part of the vibration/noise source;
- control signal-generating means for generating a control signal for controlling the vibration/noise source;
- electromechanical transducer arranged in at least one of a plurality of vibration/noise transmission paths through which the vibrations and noises from the vibration/noise source transmit;
- driving signal-generating means for generating a driving signal for driving the electromechanical transducer;
- error signal-detecting means for detecting an error signal exhibiting a difference between the driving signal and the vibrations and noises from the vibration/noise source;
- reference signal-generating means for storing a transfer characteristic of a portion of the at least one vibration/noise transmission path extending between the control signal-generating means and the error signal-detecting means, and for generating a reference signal based on the transfer characteristic and the timing pulse signal;
- control signal-updating means for updating the control signal such that the error signal is minimized, based on the error signal, the reference signal and the control signal;
- reference sine wave-generating means for generating a reference sine wave superposed on the control signal for driving the electromechanical transducer;
- delayed sine wave-generating means for generating a delayed sine wave which is delayed by a predetermined delay period M relative to the reference sine wave;
- transfer characteristic-identifying means for identifying the transfer characteristic of the portion of the at least one vibration/noise transmission path, based on the reference sine wave, the delayed sine wave, and the error signal, and for outputting an identification signal indicative of completion of the identification of the transfer characteristic; and
- transfer characteristic-updating means for updating the transfer characteristic stored in the reference signal-generating means, based on the identification signal output from the transfer characteristic-identifying means;
- wherein the transfer characteristic-identifying means is formed of an adaptive digital filter having two taps;
- the predetermined delay period M is set relative to a repetition period of the reference sine wave in a range of $\frac{1}{3} \geqq M \geqq \frac{1}{7}$, wherein M is a real number.

Preferably, the predetermined delayed period M is set to $\frac{1}{4}$ of the repetition period of the reference sine wave.

According to the first aspect of the present invention, even when the transfer characteristic of the vibration/transmission path changes with aging and an environmental change as well as with a change in the temperature, no additional complicated identification processing is required. As a result, the identification of the transfer characteristic can be achieved almost simultaneously during execution of the adaptive control in a highly accurate manner without requiring the use of an expensive temperature sensor, etc., leading to an inexpensive manufacturing cost of the system.

Also preferably, the vibration/noise control system includes superposition control means for controlling superposition of the reference sine wave on the control signal, and background noise/vibration identification signal-generating means for identifying a transfer characteristic of a background noise and vibration when the reference sine wave is not superposed on the control signal, and for generating a second identification signal indicative of completion of the identification of the transfer characteristic of the background noise and vibration;

- and wherein the transfer characteristic-updating means includes identification signal-correcting means for correcting the identification signal, based on the identification signal and the second identification signal.

As a result, even when the rotating member is operating in a steady operating condition, an identification result free of a disturbance noise signal can be obtained, leading to an increase in the identification accuracy.

According to a second aspect of the invention, there is provided a vibration/noise control system for controlling vibrations and noises generated with a periodicity or a quasi-periodicity from a vibration/noise source having at least one rotating member, comprising:

- timing pulse signal-detecting means for detecting at least one timing pulse signal exhibiting a period of vibrations and noises peculiar to at least one component part of the vibration/noise source;
- control signal-generating means for generating a control signal for controlling the vibration/noise source;
- electromechanical transducer arranged in at least one of vibration/noise transmission paths through which the vibrations and noises from the vibration/noise source transmit;
- driving signal-generating means for generating a driving signal for driving the electromechanical transducer;
- error signal-detecting means for detecting an error signal exhibiting a difference between the driving signal and the vibrations and noises from the vibration/noise source;
- reference signal-generating means for storing a transfer characteristic of a portion of the at least one vibration/noise transmission path extending between the control signal-generating means and the error signal-storing means, and for generating a reference signal based on the transfer characteristic and the timing pulse signal;
- control signal-updating means for updating the control signal such that the error signal is minimized, based on the error signal, the reference signal and the control signal;
- sine wave-generating means for generating a sine wave superposed on the control signal for driving the electromechanical transducer;
- phase-changing means for changing a phase of the sine wave;
- transfer characteristic-identifying means for identifying the transfer characteristic of the portion of the at least one of the vibration/noise transmission path, based on the sine wave having the phase thereof changed by the phase-changing means, and the error signal, and for outputting an identification signal indicative of completion of the identification of the transfer characteristic; and transfer characteristic-updating means for updating the transfer characteristic stored in the reference signal-generating means, based on the identification signal output by the transfer characteristic-identifying means.

According to the second aspect of the invention, a conventionally known lock-in identification method is applied to the vibration/noise control. This does not require the use of a digital filter and can achieve highly accurate identification of the transfer characteristic in a manner compensating for aging and a temperature change.

Preferably, the vibration/noise control system includes rotational speed-detecting means for detecting rotational speed of the rotating member, disturbance signal-detecting means for detecting a disturbance noise signal other than a vibration/noise signal generated by the rotating member, and identification permission-determining means for determining whether or not execution of the identification by the transfer characteristic-identifying means should be permitted, based on results of the detection by the disturbance noise signal-detecting means and the detection by the rotational speed-detecting means.

More preferably, the identification permission-determining means includes identification-inhibiting means for inhibiting execution of the identification by the transfer characteristic-identifying means when at least one of conditions is satisfied that rotational speed of the rotating member is higher than a predetermined value, a variation in the rotational speed of the rotating member is larger than a predetermined value, and the disturbance noise signal has a level larger than a predetermined value.

As a result, when the rotational speed of the rotating member suddenly changes or the disturbance noise is too large to obtain a highly accurate identification result, the identification processing is inhibited, to thereby avoid execution of useless arithmetic operations.

Preferably, the vibration/noise control system includes frequency-discriminating means for discriminating a particular frequency corresponding to a present value of rotational speed of the rotating member, identification signal-preserving means for preserving the identification signal output by the transfer characteristic-identifying means, and identifying frequency-determining means for determining an identifying frequency, based on the particular frequency and the identification signal preserved in the identification signal-preserving means.

More preferably, the identifying frequency-determining means determines the identifying frequency to a frequency other than the particular frequency and a frequency corresponding to a frequency of the identification signal preserved in the identification signal-preserving means.

Thus, execution of identification in a frequency region where the vibration/noise level is large, or a frequency region where the identification was executed in the past is avoided, whereby the transfer characteristic for the frequency actually desired to be identified can be preferentially identified.

Advantageously, the vibration/noise control system includes identifying amplitude-determining means for determining an amplitude value of the reference sine wave generated by the reference sine wave-generating means, based on a sensitivity dynamic factor representative of amplitude of a transfer characteristic of a portion of the at least one vibration/noise transmission path extending between the error signal-detecting means and a predetermined area in the at least one vibration/noise transmission path.

More preferably, the sensitivity dynamic factor is set such that the amplitude of the transfer characteristic is smaller than an amplitude value of the error signal by a predetermined amount.

As a result, an identifying reference signal is generated, which is not sensed by a human being, and therefore the identification does not give an uncomfortable feeling to the human being.

Preferably, the control signal-generating means comprises an adaptive digital filter having two taps.

Also preferably, the transfer characteristic-identifying means and the control signal-updating means are arranged such that arithmetic operations thereof are carried out by a single control block.

Preferably, the vibration/noise control system includes monitoring means for monitoring an operative state of the control signal-updating means, and wherein the monitoring means inhibits the identification permission-determining means from determining the identification permission when an arithmetic operation of the control signal-updating means is executed, and permits the identification permission-monitoring means to determine the identification permission when the arithmetic operation of the control signal-updating means is not executed.

As a result, the transfer characteristic can be identified at a low manufacturing cost as well as in an efficient manner.

The above and other objects, features, and advantages of the invention will become more apparent from the following detailed description taken in conjunction with the accompanying drawings.

DETAILED DESCRIPTION

The invention will now be described in detail with reference to the drawings showing embodiments thereof, in which the system is applied to an automotive vehicle.

Figure 1:
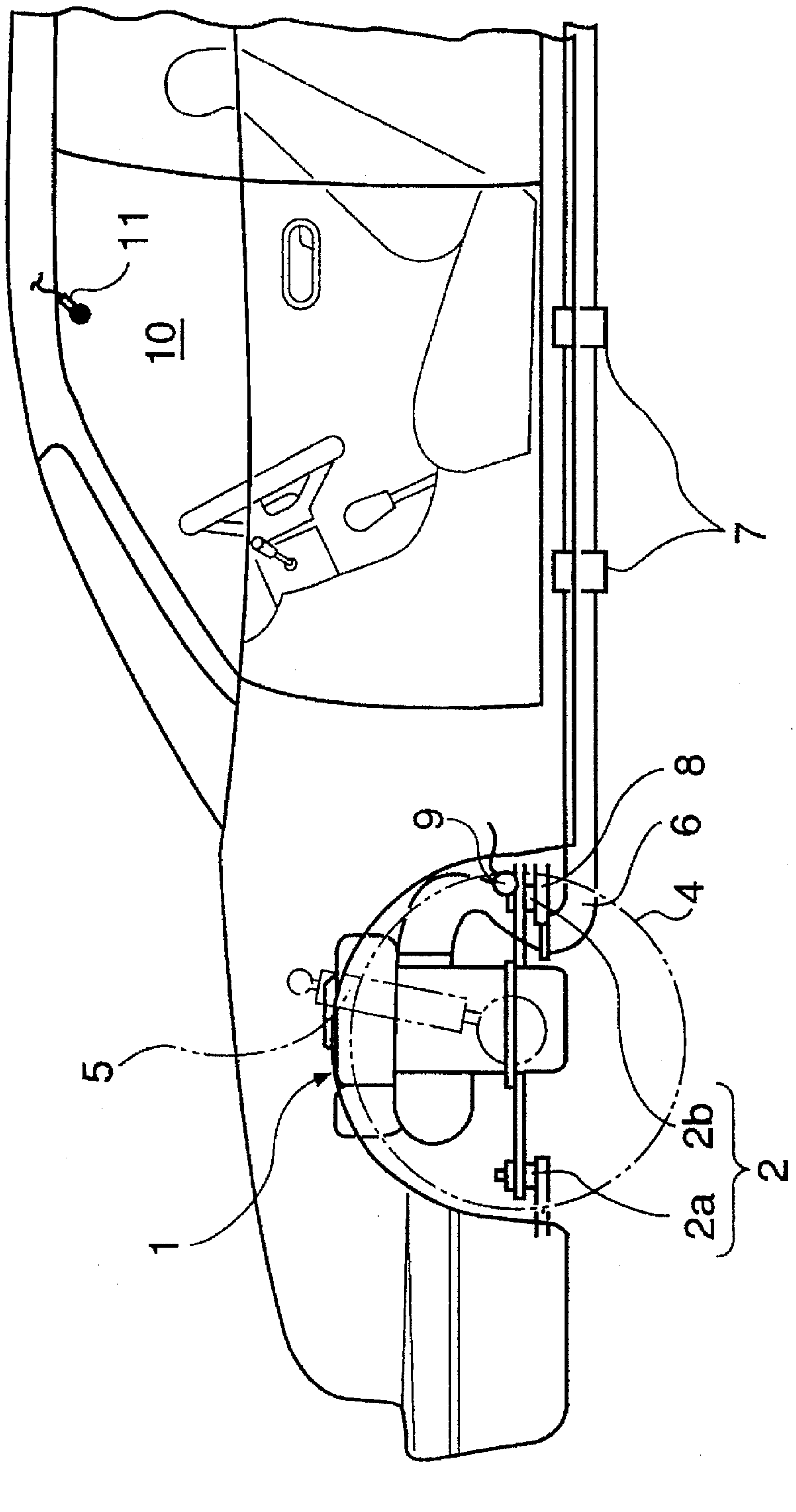
FIG. 1 is a schematic diagram showing how an engine is mounted on the chassis of an automotive vehicle.

FIG. 1 schematically shows how an engine is mounted on the chassis of an automotive vehicle, wherein the engine forms a source of vibrations and noises generated with a periodicity or a quasi-periodicity.

In the figure, reference numeral 1 designates an internal combustion engine of a four-cycle straight four-cylinder type (hereinafter simply referred to as "the engine") as a power plant for driving an automotive vehicle. The engine 1 is supported on a chassis 8 by an engine mount 2, a suspension device 5 for front wheels (driving wheels) 4, and a supporting means 7 for an exhaust pipe 6.

The engine mount 2 is comprised of a suitable number of self-expanding engine mounts 2*a* as electromechanical transducer means which are capable of changing a vibration/noise transfer characteristic thereof, and a suitable number of normal or known engine mounts 2*b* which are incapable of changing a vibration/noise transfer characteristic thereof.

The self-expanding engine mounts 2*a* have respective actuators incorporated therein, which are formed of voice coil motors (VCM), piezo-electric elements, magnetostrictive elements, or the like, and operate to control vibrations of the engine according to a signal from an electronic mount control unit (hereinafter referred to as "the EMCU"), not shown, in a manner responsive to vibrations of the engine. More specifically, the self-expanding engine mounts 2*a* are each formed therein with a liquid chamber, not shown, which is filled with liquid, and operate to prevent vibrations from being transmitted from the engine 1 to the chassis 8, via elastic rubber members, not shown, fixed to the engine 1 (vibration/noise source) by means of the actuators.

A vibration error sensor 9 is provided in the vicinity of the engine mounts 2*b*, and a disturbance noise sensor 11, such as a microphone, in a compartment 10 at a ceiling portion thereof above the front seats. The vibration error sensor 9 generates an error signal $\epsilon$ as a result of cancellation of a vibration noise signal D generated by the engine 1 and a driving signal Z for driving the actuator. The disturbance noise sensor 11 detects road noises and the like during traveling of the vehicle and generates a signal indicative of the sensed noises. A rotation sensor, not shown, which is formed of a magnetic sensor or the like, is arranged in the vicinity of a flywheel, not shown, fixed to a crankshaft, not shown, of the engine 1, for detecting rotation of the flywheel.

Figure 2:
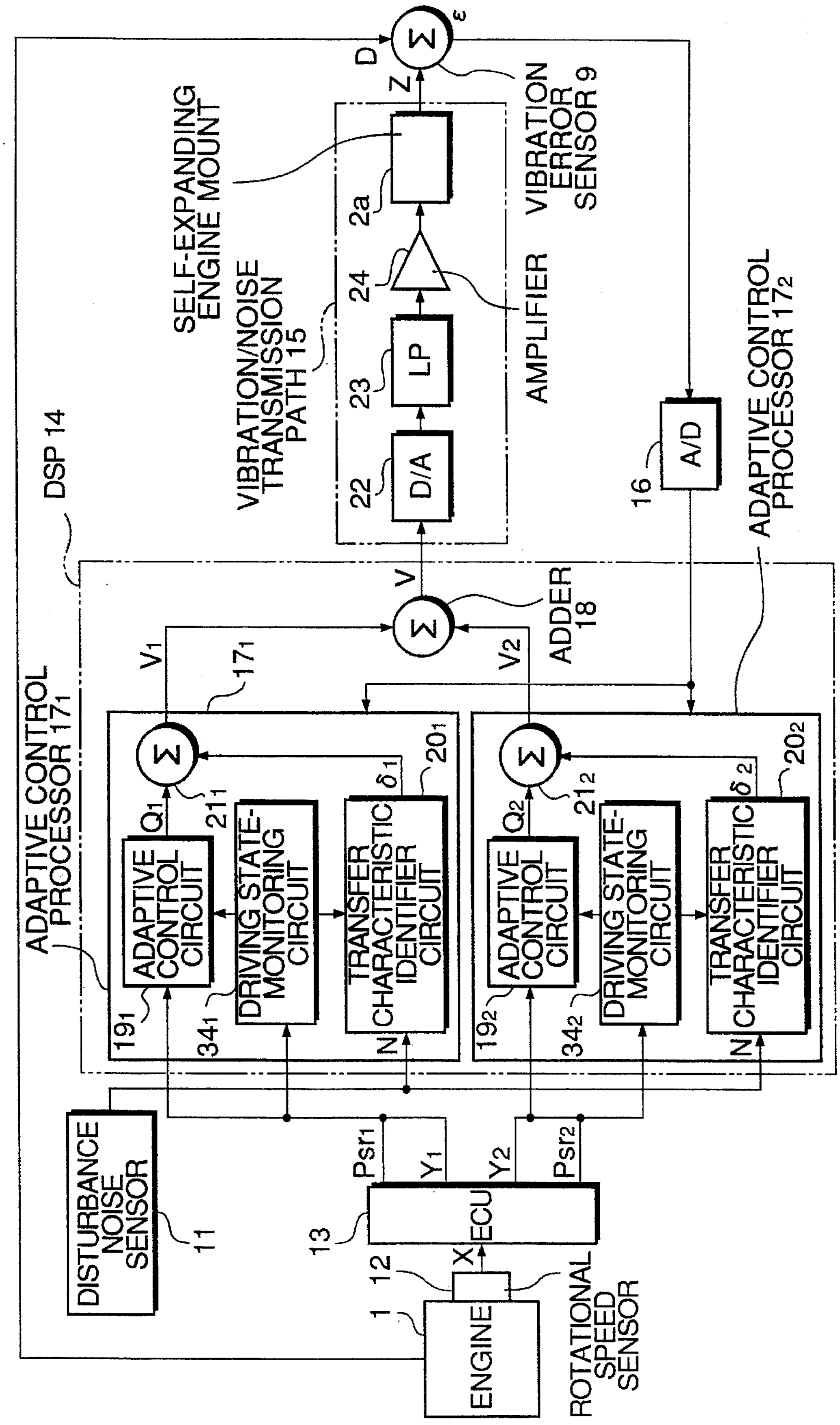
FIG. 2 is a block diagram schematically showing the whole arrangement of a vibration/noise control system according to a first embodiment of the invention.

FIG. 2 schematically shows the whole arrangement of a vibration/noise control system according to a first embodiment of the invention.

The vibration/noise control system is comprised of the rotation sensor 12, an electronic control unit (hereinafter referred to as "the ECU") 13 for generating timing pulse signals $Y_1$ and $Y_2$ which exhibit vibration/noise repetition periods depending on respective component parts, by shaping the waveform of the rotation signal X from the rotation sensor 12, a digital signal processor (hereinafter referred to as "the DSP") 14 which is capable of making high-speed operation to perform adaptive control upon outputting of the timing pulse signals $Y_1$ and $Y_2$ from the ECU 13 as trigger signals, the disturbance noise sensor 11 for detecting noises such as road noises and supplying a signal indicative of the senses noises to the DSP 14, a vibration/noise transmission system 15 for converting a third control signal V (digital signal) which is output from the DSP 14 into the driving signal Z, the vibration error sensor 9 which is supplied with the driving signal Z and the vibration noise signal D from the engine 1, and an A/D converter 16 for converting the error signal $\epsilon$ (analog signal) from the vibration error sensor 9 into a digital signal and supplying the same to the DSP 14 in a feedback manner.

More specifically, the rotation sensor 12 counts teeth of a ring gear provided along the periphery of the flywheel to detect the rotation signal X in the form of pulses, and delivers the rotation signal X to the ECU 13. The ECU 13 divides the frequency of the pulse signal X, based on a vibration/noise transfer characteristic peculiar to engine component parts, such as the piston system and the combustion chamber of the engine 1 (vibration source), to thereby generate two types of timing pulse signals $Y_1$ and $Y_2$.

The ECU 13 generates the timing signal pulse $Y_1$ which is suitable for controlling a vibration component (primary vibration component) caused by the piston system and having a regular vibration/noise characteristic in synchronism with rotation of the engine 1, and the timing pulse signal $Y_2$ which is suitable for controlling a vibration component (secondary vibration component) caused by explosion pressure (exciting force) and having an irregular vibration/noise characteristic depending on a combustion state of the engine. In other words the piston system carries out one reciprocating motion per rotation of the crankshaft, and it is therefore considered that vibration of the piston system occurs once per rotation of the crankshaft. Accordingly, the timing pulse signal $Y_1$ for controlling the primary vibration component is generated once per rotation of the crankshaft of the engine 1. On the other hand, one explosion stroke takes place per two rotations of the crankshaft, and therefore vibration caused by the explosion stroke occurs once per two rotations of the crankshaft. In the four-cylinder engine, four explosion strokes take place per two rotations of the crankshaft, and therefore the timing pulse signal $Y_2$ for controlling the secondary vibration component is generated once per half a rotation of the crankshaft of the engine 1. These timing pulse signals $Y_1$ and $Y_2$ are supplied to the DSP 14.

Thus, the invention employs the concept of the vibration order and carries out the adaptive control on each of a plurality of vibration orders of the vibration components, which makes it possible to reduce vibrations and noises more effectively. In the present embodiment, the adaptive control is separately carried out on the primary vibration component having a regular vibration noise characteristic and on the secondary vibration component, which is related to the explosion pressure and has an irregular vibration/noise characteristic, to thereby effectively reduce the vibrations and noises.

The ECU 13 divides the generation time intervals of the timing pulse signals $Y_1$ and $Y_2$ to generate variable sampling pulse signals $Psr_1$ and $Psr_2$ whenever the engine rotates through a predetermined very small rotational angle (e.g. 3.6°). These variable sampling pulse signals $Psr_1$ and $Psr_2$ are supplied to the DSP 14.

The means for detecting the rotation of the engine is not limited to a sensor of the above-mentioned type which counts the teeth of the ring gear of the flywheel, but an encoder or the like may be used for directly detecting the rotation of the crankshaft or the camshaft and generating a signal indicative of the sensed rotation. However, when the rotation of the crankshaft is directly detected, the detection is susceptible to variations in the rotation which are caused by torsional vibrations of the crankshaft, etc. Also when the rotation of the camshaft is directly detected, the detection is susceptible to variations in the rotation of the camshaft, though they are slight in magnitude, e.g. due to elongation of a timing belt connecting between a pulley mounted on the camshaft and a pulley mounted on the crankshaft. In contrast, the flywheel, which is rigidly fixed to the crankshaft, has a large moment of inertia and hence little suffers from variations in its rotation. Therefore, detection of the rotation signal X obtained by counting the teeth of the ring gear as employed in the present embodiment is advantageous in that it can provide a desired sampling frequency in an easier and more accurate manner.

The DSP 14 is comprised of an adaptive control processor $17_1$ for executing the adaptive control in synchronism with generation of the timing pulse signal $Y_1$, an adaptive control processor $17_2$ for executing the adaptive control in synchronism with generation of the timing pulse signal $Y_2$, and an adder 18 for adding together second control signals $V_1$ and $V_2$ output respectively from the two adaptive control processors $17_1$ and $17_2$. Further, the adaptive control processors $17_1$ and $17_2$ are comprised, respectively, of adaptive control circuits $19_1$ and $19_2$ for outputting respective first control signals $Q_1$ and $Q_2$, transfer characteristic identifier circuits $20_1$ and $20_2$ for identifying the transfer characteristic of the vibration/noise transmission system 15 simultaneously during execution of the adaptive control, under predetermined conditions, referred to hereinafter, driving state-monitoring circuits $34_1$ and $34_2$ for normally monitoring the driving states of the respective adaptive control circuits $19_1$ and $19_2$ and the respective transfer characteristic identifier circuits $20_1$ and $20_2$, and adders $21_1$ and $21_2$ for adding together respective identifying reference signals $\delta_1$ and $\delta_2$ output from the respective transfer characteristic identifier circuits $20_1$ and $20_2$ and the respective first control signals $Q_1$ and $Q_2$ output from the respective adaptive control circuits $19_1$ and $19_2$, to generate the respective second control signals $V_1$ and $V_2$.

The vibration/noise transmission system 15 is comprised of a D/A converter 22 for converting the third control signal V (digital signal) into an analog signal, a low-pass filter (LPF) 23 (cut-off frequency Fc=Fs/2) for smoothing an output signal (rectangular signal) from the D/A converter 22, an amplifier 24 for amplifying an output signal from the LPF 23, and the aforementioned self-expanding engine mount 2a.

Figure 3:
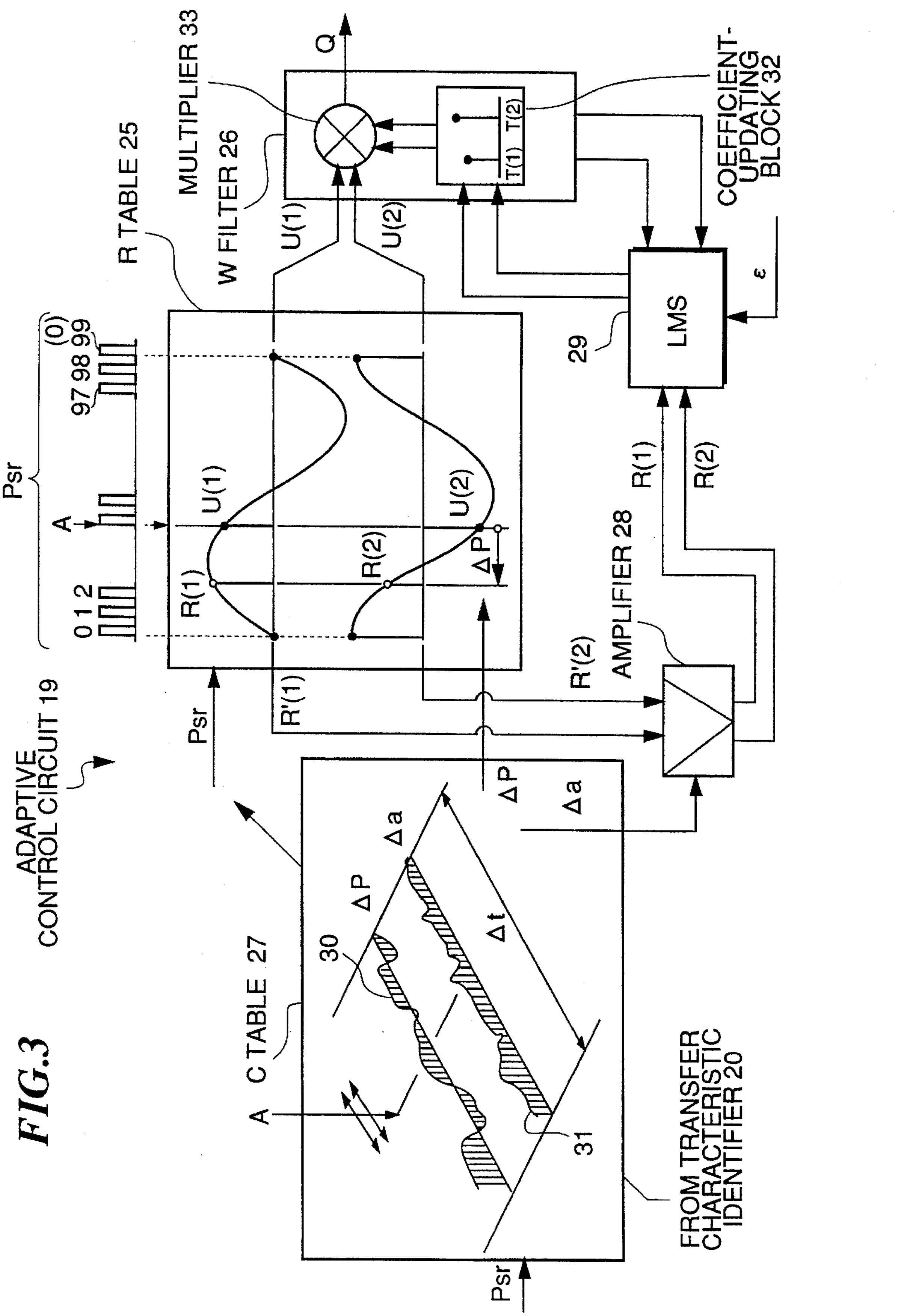
FIG. 3 is a block diagram schematically showing details of an adaptive control circuit employed in the first embodiment.

The adaptive control circuit 19 of the adaptive control processor 17 is constructed as shown in FIG. 3 and comprised of reference signal memory means (hereinafter referred to as "the R table") 25 which is supplied with the variable sampling pulse signal Psr and delivers control reference signals U(1) and U(2) and basic reference signals R'(1) and R'(2) according to the variable sampling pulse signal Psr, a W filter 26 (control signal-generating means) having two taps, which is formed by an FIR-type ADF, for filtering the control reference signals U(1) and U(2), phase/amplitude characteristic memory means (hereinafter referred to as "the C table") 27 in which is stored the phase/amplitude characteristic (transfer characteristic) peculiar to the vibration/noise transmission system 15, which has been identified beforehand, and which can be updated by the transfer characteristic identifier circuit 20, an amplifier 28 for amplifying the amplitude of the basic reference signal R' output from the R table 25, by a predetermined gain variable Δa, and a control LMS (least mean square) processor 29 which operates on an adaptive control algorithm for executing arithmetic operation for updating the filter coefficient of the W filter 26. The C table 27 and the amplifier 28 cooperate to form reference signal-generating means.

The R table 25 specifically stores digital values of a control reference sine wave having a single repetition period and a control delayed sine wave which is delayed in phase by ¼ of the repetition period of the control reference signal (phase delay of $\pi/2$) relative to the control sine wave, the digital values being sampled with a period corresponding to the interval of a very small rotational angle of the engine, e.g. 3.6°, which corresponds to the generation timing of the variable sampling pulse signal Psr. For example, when the primary vibration component of the engine is to be controlled, during one rotation of the flywheel corresponding to one repetition period of the primary vibration component, 100 pulses of the variable sampling pulse signal Psr are sequentially input to address 0, address 1, . . . , address 99, at equal intervals. The timing of inputting of each pulse of the variable sampling pulse signal Psr is used as a readout pointer (indicated by the arrow A in the figure) to read out digital values indicative of the sine wave and the delayed sine wave corresponding to the input pulses of the variable sampling pulse signal Psr.

Further, the C table 27 is comprised of a ΔP table 30 in which predetermined values of a shift amount ΔP indicative of a phase delay $\phi$ relative to the control reference signal U are stored, and a Δa table in which predetermined values of a variable Δa indicative of the gain of the basic reference signal R' delivered from the R table 25 are stored. More specifically, the shift amount ΔP and the gain variable Δa corresponding to the readout pointer (indicated by the arrow A in the R table 25) for reading digital values of the control reference sine wave and the control delayed sine wave, which are determined upon inputting of each pulse of the variable sampling pulse signal Psr, are identified in advance according to the vibration/noise transmission path. Values of the shift amount ΔP and the gain variable Δa are read out from addresses of the C table 27 corresponding to the readout pointer. The C table 27 has its shift amount ΔP and gain variable Δa updated by the transfer characteristic identifier circuit 20 in a manner described hereinafter.

Thus, whenever each pulse of the variable sampling pulse signal Psr is input, the R table 25 and the C table 27 are retrieved to determine at one time a set of values of the control reference signals U(1), U(2) and the transfer characteristic-dependent reference signal R(1) and R(2), which correspond to the generation timing of the variable sampling pulse signal Psr.

The C table 27 also has the function of counting the generation time intervals ΔY of the timing pulse signals $Y_1$ and $Y_2$, to calculate a value of the engine rotational speed NE which is proportional to the reciprocal of the ΔY value, and the thus calculated engine rotational speed NE is supplied via the driving condition-monitoring circuit 34 to the transfer characteristic identifier circuit 20.

Values of the control reference sine wave and the control delayed sine wave read out in synchronism with inputting of the variable sampling pulse signal Psr are supplied to the W filter 26 as the control reference signals U(1), U(2). On the other hand, from the C table 27, whenever the variable sampling pulse signal Psr is input, values of the shift amount ΔP and the gain variable Δa corresponding to the position of the readout pointer are read out. The shift amount ΔP is delivered to the R table 25 from which a digital value of the sine wave and a digital value of the delayed sine wave which are shifted by the shift amount ΔP are read out and delivered as the basic reference signals R'(1) and R'(2) to the amplifier 28. Then, the amplifier 28 amplifies the basic reference signals R'(1) and R'(2) by the gain variable Δa supplied from the C table 27 into the transfer characteristic-dependent reference signals R(1) and R(2), which are then input to the LMS processor 29.

Then, at the control LMS processor 29, first and second filter coefficients T(1) and T(2) of the W filter 26 are updated based on the following equations (1) and (2):

$$T(1)(i+1)=T(1)(i)+\mu\times R(1)\times\epsilon \quad (1)$$

$$T(2)(i+1)=T(2)(i)+\mu\times R(2)\times\epsilon \quad (2)$$

where T(1)(i+1) and T(2)(i+1) represent updated values of the first and second filter coefficients T(1) and T(2), and T(1) (i) and T(2) (i) represent the immediately preceding values of the first and second filter coefficients T(1) and T(2), respectively. μ represents a step-size parameter for defining an amount of correction for updating the coefficients, which is set to a predetermined value dependent on the object to be controlled.

Then, a coefficient-updating block 32 in the W filter 26 updates the filter coefficient of the W filter by the updated coefficients T(1) and T(2), and a multiplier 33 multiplies the thus updated filter coefficients T(1) and T(2) by the control reference signals U(1) and U(2), respectively, to thereby generate the first control signal Q.

In the coefficient-updating block 32, one (T(1)) of the two filter coefficients of the two-tap W filter 26 is updated by the control reference signal U(1) based on the control reference sine wave, while the other filter coefficient (T(2)) by the control reference signal U(2) based on the control delayed sine wave. As a result, the vibration/noise control system can be converged in a short time period, to thereby reduce a burden on the software of the system as well as enhance the converging speed.

Figure 4:
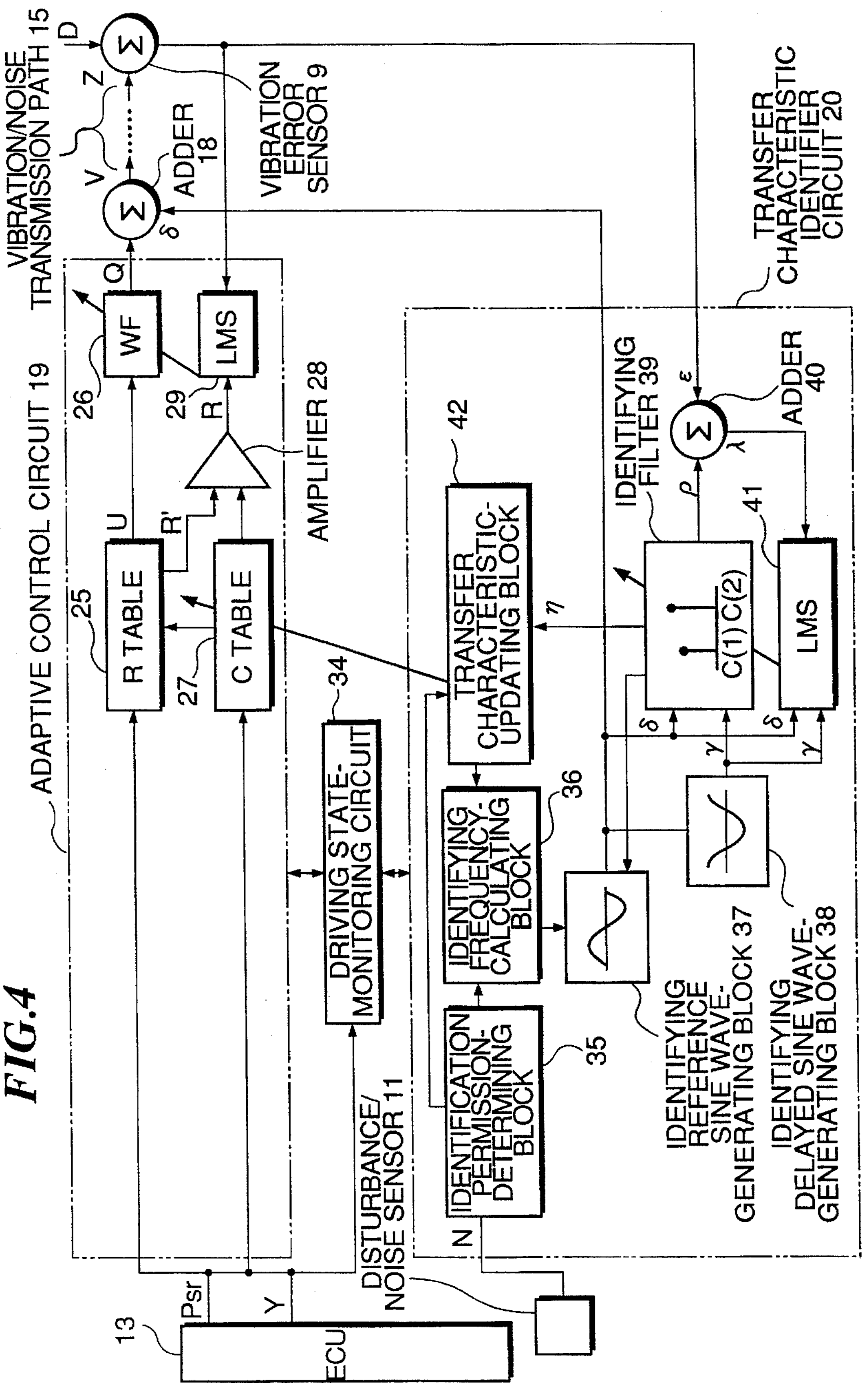
FIG. 4 is a block diagram schematically showing the arrangement of an adaptive control processor employed in the first embodiment.

FIG. 4 schematically shows details of a transfer characteristic identifier circuit 20 according to the first embodiment, together with details of the adaptive control circuit 19.

The transfer characteristic identifier circuit 20 is comprised of an identification permission-determining block 35 which is driven upon a notification from the driving state-monitoring circuit 34 that the adaptive control circuit 19 is not driven, an identifying frequency-calculating block 36 for calculating an identifying frequency FREQ when identification is permitted by the identification permission-determining block 35t an identifying reference signal-generating block 37 for generating an identifying reference sine wave signal δ in response to an output signal from the identifying frequency-calculating block 36, a delayed signal-generating block 38 for generating an identifying delayed sine wave signal γ which is delayed in phase by ¼ of the repetition period (phase delay of π/2) relative to the identifying reference sine wave signal δ, an identifying filter 39 having two taps, which is formed by an FIR-type ADF, for filtering the identifying reference sine wave signal δ and the identifying delayed sine wave signal γ, an adder 40 for adding together an identifying control signal ρ output from the identifying filter 35 and the error signal ε to generate a difference signal λ, an identifying LMS processor 41 for updating the filter coefficient of the identifying filter 39, based on the difference signal λ, the identifying reference sine wave signal δ, and the identifying delayed sine wave signal γ, and a transfer characteristic-updating block 42 which is supplied with an identification signal η converged by the operation of the identifying LMS processor 41. Phase/amplitude information (transfer characteristic) of the C table 27 in FIG. 3 is updated based on an output from the transfer characteristic-updating block 42. The identifying filter 39 and the identifying LMS processor 41 cooperate to form transfer characteristic-identifying means.

The vibration/noise control system of the present embodiment is constructed such that the driving state-monitoring block 34 normally monitors the operative state of the adaptive control circuit 19, and inhibits the transfer characteristic identifier circuit 20 from being driven when the adaptive control circuit 19 is driven, while permitting the same to be driven when the adaptive control circuit 19 is not driven.

According to the vibration/noise control system, since the W filter 26 in the adaptive control circuit 19 has two taps, as mentioned above, the system has a high converging speed. Especially, when the engine rotational speed NE is low, there is a high possibility that the system is converged in an extremely short time period, which affords a time period during which the control LMS processor 29 does not actually execute the arithmetic operation, before inputting of the next timing pulse, i.e. an operation-null time period. Therefore, the vibration/noise control system can carry out identification of the transfer characteristic during the operation-null time period.

Thus, it is possible to prevent an extremely large operational burden from being imposed on the DSP 14, which makes it possible to carry out the operation by a single control block, thereby avoiding an extreme increase in the manufacturing cost.

According to the vibration/noise control system of the present embodiment, the adaptive control circuit 19 is preferentially driven, and therefore, even when the transfer characteristic identifier circuit 20 is being driven, if the adaptive control circuit 19 starts to be driven upon inputting of the timing pulse signal Y, the transfer characteristic identifier circuit 20 is stopped.

More specifically, when the adaptive control circuit 19 is driven, the first control signal Q is generated by the adaptive control circuit 19 as described above, which is delivered through the adder 18 to be output as the second control signal V. The second control signal V is converted into the driving signal Z by the vibration/noise transmission system 15, and input to the vibration error sensor 9. On the other hand, the vibration noise signal D from the engine 1 as the vibration/noise source is input to the vibration error sensor 9, by which the driving signal Z and the vibration noise signal D are canceled, whereby the error signal ε is generated. Further, the error signal ε is supplied to the control LMS processor 29 in a feedback manner, whereby the filter coefficient of the W filter 26 is updated.

On the other hand, when the transfer characteristic identifier circuit 20 is notified by the driving state-monitoring block 34 that the adaptive control circuit 19 is not driven, the transfer characteristic identifier circuit 20 is driven during the operation-null time period of the adaptive control circuit 19. More specifically, the identification permission-determining block 35 is supplied with a disturbance noise signal N from the disturbance noise sensor 11 and the engine rotational speed NE calculated by the C table 27, from the adaptive control circuit 19. If the engine rotational speed NE, a variation ΔNE thereof, or the disturbance noise signal N is smaller in level or magnitude than a predetermined value NEL, ΔNEX, or NL, respectively, identification is permitted, and the identifying frequency-calculating block 36 calculates the identifying frequency FREQ and an identifying amplitude value AI corresponding thereto.

More specifically, the identifying frequency-calculating block 36 detects a predetermined avoiding frequency AF, referred to hereinafter, and refers to updating record information from the transfer characteristic-updating block 42, to thereby calculate the identifying frequency FREQ exclusive of the avoiding frequency AF and the updating record information. Further, based on the amplitude of the transfer characteristic of the path extending from the vibration error sensor 9 to a passenger within the compartment, as well as the disturbance noise signal N, the gain is set such that the S/N ratio becomes the maximum insofar as identifying sound is not sensed by the passenger, to thereby calculate the identifying amplitude value AI.

The identifying signal-generating block 37 forms and generates the identifying reference sine wave signal δ, based on the identifying frequency FREQ and the identifying amplitude AI. Then, the identifying reference sine wave signal δ is input to the adder 18, where it is superposed on the first control signal Q from the W filter 26, to thereby output the second control signal V. Further, the identifying reference sine wave signal δ is input to the identifying filter 39 and the identifying LMS processor 41 together with the identifying delayed sine wave signal γ output from the delayed signal-generating block 38, whereby the filter coefficient value of the identifying filter 39 is updated based on the difference signal λ input from the adder 40, the identifying reference sine wave signal δ, and the identifying delayed sine wave signal γ. When the result of operation is converged, the identification signal η is generated from the identifying filter 39 and delivered to the transfer characteristic-updating block 42, where it is stored into a memory (RAM) incorporated in the transfer characteristic-updating block 42.

The transfer characteristic-updating block 42 selects out of stored previous values of the identification signal η as well as an updated value thereof in the present loop, etc., a value which satisfies predetermined conditions, and outputs the same to the C table 27 to update the phase/amplitude information.

As described before, even during operation of the transfer characteristic identifier circuit 20, whenever the timing pulse signal Y is input, the transfer characteristic identifier circuit 20 is stopped in order to allow the operation of the adaptive control circuit 19.

FIGS. 5A to 5D collectively show a program for carrying out the adaptive control executed by the adaptive control circuit 19 and controlling the identifying operation executed by the transfer characteristic identifier circuit 20.

First, it is determined at a step 1, by the driving state-monitoring circuit 34, whether or not the timing pulse signal Y has been input from the ECU 13 to the adaptive control circuit 19. If the timing pulse signal Y has been input, steps S2 to S8 are executed by the adaptive control circuit 19 to carry out the adaptive control.

More specifically, when the timing pulse signal Y has been input to the adaptive control circuit 19, the first control signal Q is output from the W filter 26 upon inputting of the timing pulse signal Y as a trigger, at the step S2, and the generation time interval ΔY between adjacent pulses of the timing pulse signal Y is counted at the step S3. Then, the engine rotational speed NE which is the reciprocal of the generation time interval ΔY is calculated and the calculation result is stored into the memory (RAM) incorporated in the C table 27, at the step S4. Then, a variation ΔNE in the engine rotational speed NE between a last value NE(n−1) thereof and a present value NE(n) thereof is calculated, and the calculation result is stored into the memory, at the step S5. The engine rotational speed NE and the variation ΔNE therein will be used for determination of identification permission.

At the following step S6, the error signal ε from the vibration error sensor 9 is read in by the control LMS processor 29, and the filter coefficient of the W filter 26 is updated based on the error signal ε, the reference signal R, and a present value of the first control signal Q, at a step S7, to thereby set a value of the first control signal Q to be output upon inputting of the next pulse of the timing pulse signal Y, and the thus set value of the first control signal Q is stored into a memory (RAM) incorporated in the W filter, at the step 8, followed by the program returning to the step S1.

As described above, according to the vibration/noise control system of the present embodiment, the filter coefficient of the W filter 26 is updated only once upon first inputting of the timing pulse signal Y.

Next, after the steps S2 to S8 are executed upon inputting of the timing pulse signal Y, the answer at the step S1 becomes negative (NO), and then determination of identification permission is executed at steps S9 to 16, i.e. it is determined whether or not the identifying operation of the transfer characteristic should be executed.

More specifically, it is determined at the step S9 whether or not the engine rotational speed NE calculated at the step S5 is lower than the predetermined rotational speed NEL (e.g. 4000 rpm). If the answer is negative (NO), i.e. if the engine rotational speed exceeds the predetermined rotational speed NEL, the program proceeds to the step S15. On the other hand, if the answer at the step S9 is affirmative (YES), it is determined at the step S10 whether or not a flag FLGI is set to "1". The flag FLGI is set to "1" when the identification has been completed. In the first loop of execution of the step, the answer is negative (NO), and then the program proceeds to the step S11.

At the step S11, it is determined whether or not the variation ΔNE in the engine rotational speed calculated at the step S5 is smaller than the predetermined value ΔNEX (e.g. 50 rpm). If the answer is negative (NO), the program proceeds to the step S15, whereas if the answer is affirmative (YES), the disturbance noise signal N from the disturbance noise sensor 11 is read in at the step S12. Then, it is determined at the step S13 whether or not the disturbance noise signal N is smaller in level than the predetermined disturbance level NL (e.g. 70 dB). If the answer is affirmative (YES), it is determined that the identifying operation should be permitted, and then the program proceeds to the step S14, wherein it is determined whether or not a flag FLGS is set to "1". The flag FLGS is set to "1" when the identifying reference sine wave signal δ is generated from the identifying reference signal-generating block 37. That is, if the flag FLGS is set to "0", it means that the identifying reference sine wave signal δ is not generated, and therefore steps S23 et seq., referred to hereinafter, are executed to carry out the identifying operation. On the other hand, if the flag FLGS is set to "1", i.e. if the identifying reference sine wave signal δ has been generated, the program proceeds to a step S30, wherein the identifying operation is executed.

On the other hand, if the answer at the step S13 is negative (NO), which means that the identifying operation should be inhibited, the program proceeds to the step S15, wherein it is determined whether or not the flag FLGS is set to "0". If the answer is affirmative (YES), it means that the identifying reference sine wave signal δ is not generated from the identifying reference signal-generating block 37, and then the operation of identifying the transfer characteristic is terminated, followed by the program proceeding to a step S20 in FIG. 5B. On the other hand, if the answer at the step S15 is negative (NO), i.e. the identifying reference sine wave signal δ has been output from the identifying reference signal-generating block 37, the identifying reference sine wave signal δ is inhibited from being output therefrom, and then the flag FLGS is set to "0" at the step S16 to inhibit the operation of identifying the transfer characteristic, followed by the program proceeding to the step S20 in FIG. 5B.

As described above, the vibration/noise control system according to the present embodiment does not execute the identifying operation when the engine rotational speed NE is high, the engine rotational speed NE suddenly changes, or the disturbance noise signal N is extremely large. This is based on the following grounds: When the engine rotational speed exceeds the predetermined rotational speed NEL, the time interval ΔY of generation of the timing pulses Y is short, and hence the time period over which the identifying operation is allowed is short, resulting in the fear that highly accurate identification cannot be achieved. Further, when the engine rotational speed NE suddenly changes, there is a fear that highly accurate identification cannot be achieved, either. Besides, when the level of the disturbance noise signal N is larger than the predetermined noise level NL on such an occasion as traveling of the vehicle on a rough road surface, a satisfactory S/N ratio cannot be obtained, resulting in the fear that highly accurate identification cannot be achieved. Therefore, as mentioned above, when the engine rotational speed NE is high, the engine rotational speed NE suddenly changes, or the disturbance signal N is extremely large, the identifying operation is inhibited.

Then, if the answer at the step S10 is affirmative (YES), i.e. if the transfer characteristic has been identified in a manner described hereinafter, the program proceeds to a step S17, wherein the C table 27 is updated. More specifically, past values of the identification signal η stored in the transfer characteristic-updating block 42, a value thereof updated in the last loop, etc. are referred to, and only a value satisfying the predetermined conditions is selected and delivered to the C table 27, to thereby update the filter coefficient of the W filter. In this regard, it is desirable that the value of the identification signal η to be delivered to the C table 27 should have an optimal updating weight. That is, it is desirable that updating of the filter coefficient should be carried out not only on a value of the identifying frequency FREQ to be used for the present updating but also on values neighboring with the FREQ value so that the transfer characteristic can be exhibited smoothly by the use of the weight. In this connection, a change in the properties of the rubber members due to aging or temperature change occurs moderately with the lapse of time if the rubber members are under normal use, and therefore even if the updating weight is set to such a small value that the transfer characteristic stored does not exhibit a sharp change, a desired object can be satisfactorily achieved.

Then, at a step S18, the flag FLGI is set to "0", indicating to the C table 27 that updating at the predetermined identifying frequency FREQ has been carried out. Then, the identification signal η updated in the present loop is written into the transfer characteristic-updating block 42 at a step S19, and then the determination of identification permission, is carried out at the steps S11 to S16 as described before, to thereby determine whether or not the identifying operation should be executed.

Figure 5A:
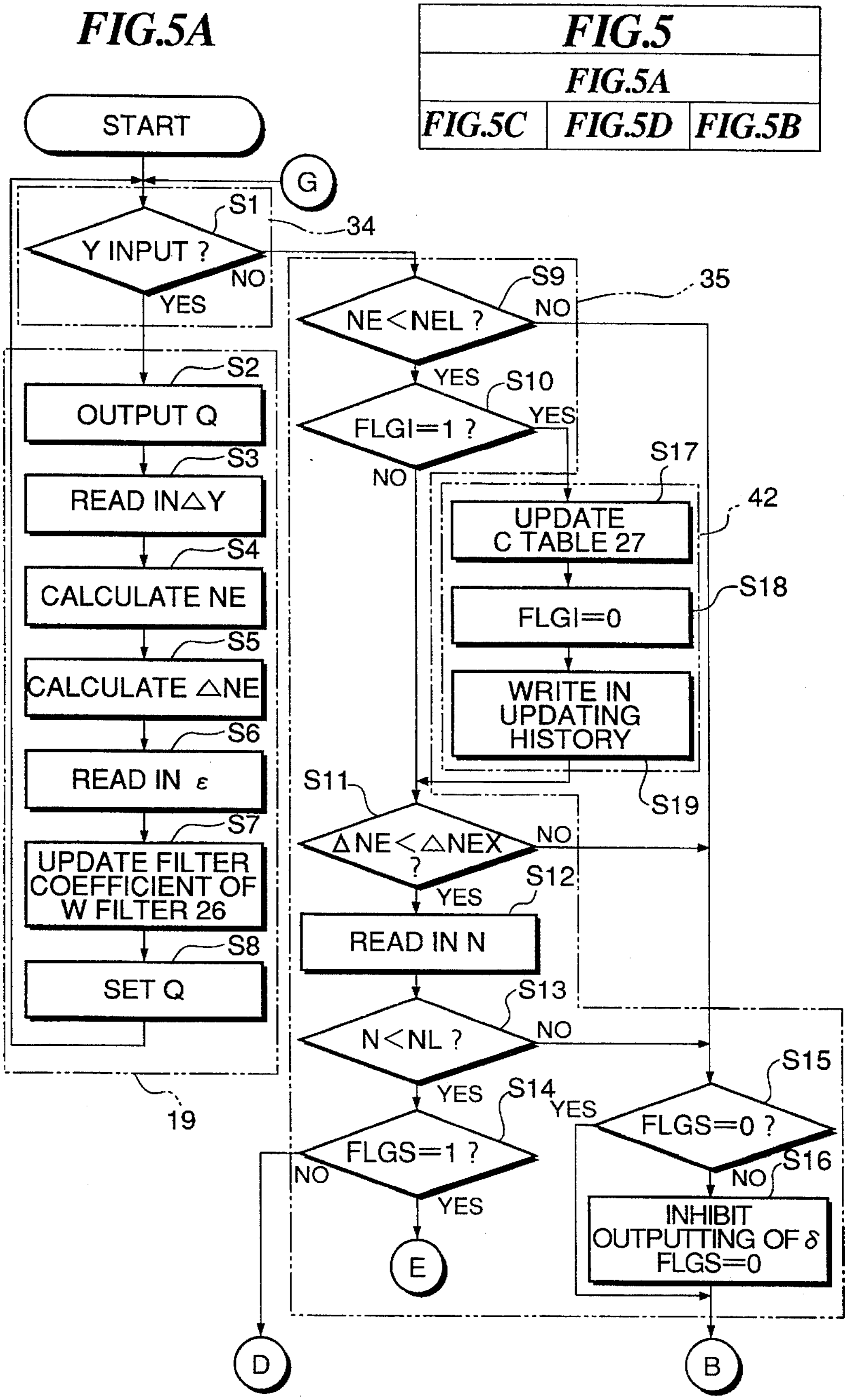
FIG. 5A is a flowchart showing a program for executing vibration/noise control according to the first embodiment.
Figure 5B:
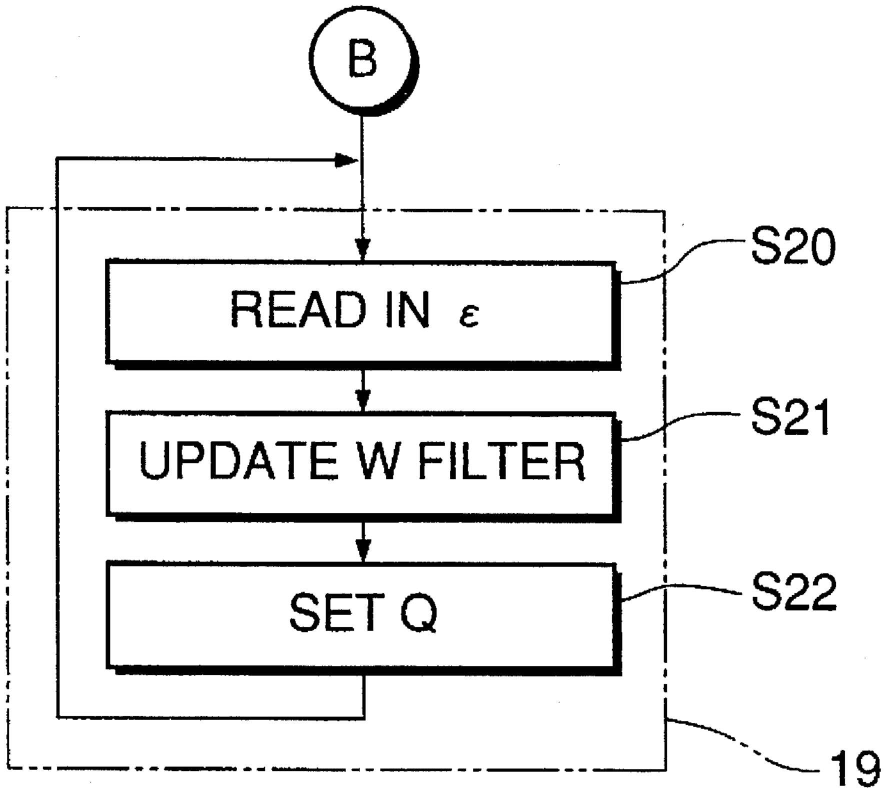
FIG. 5B is a continued part of the flowchart of FIG. 5A.
Figure 5C:
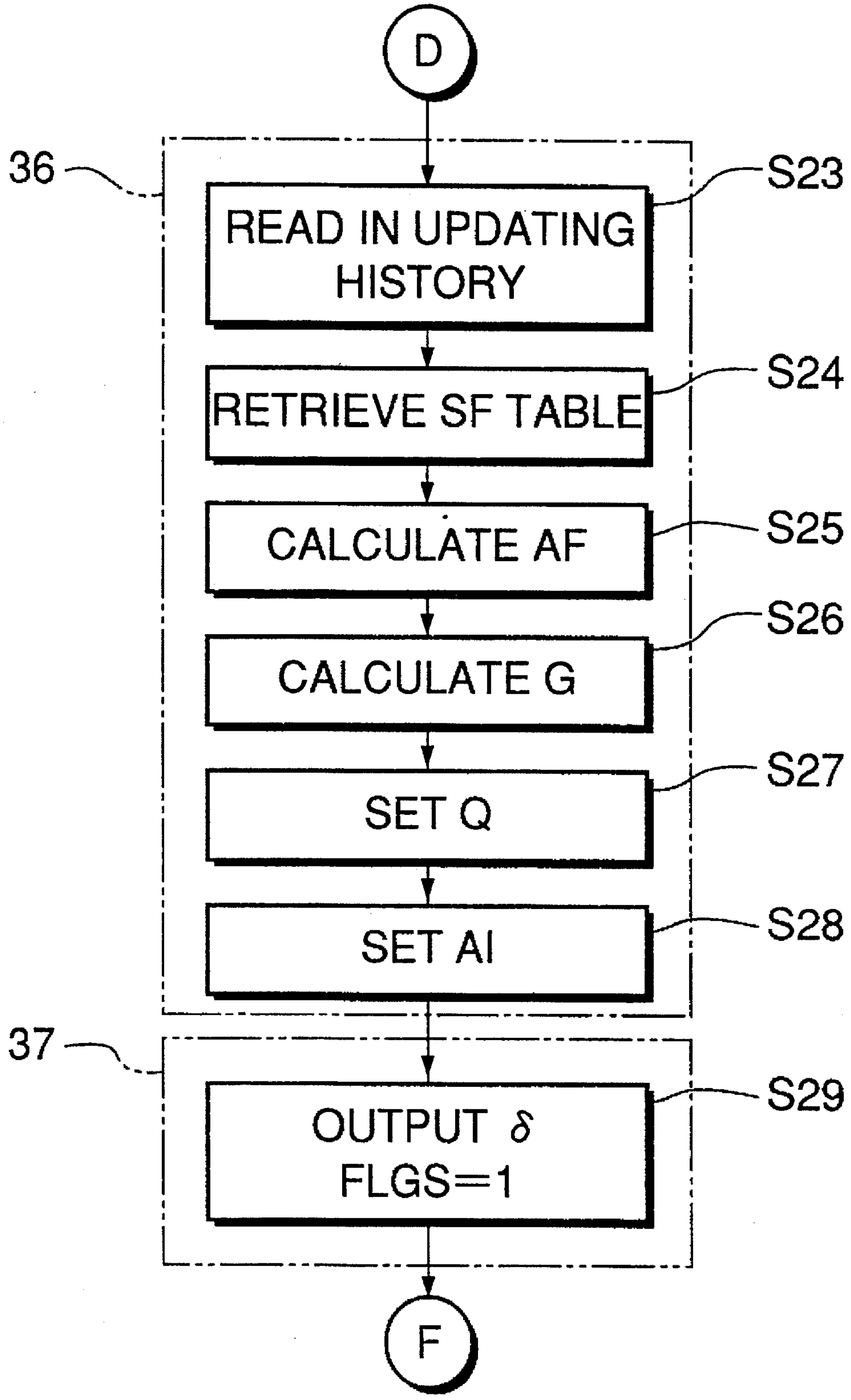
FIG. 5C is a continued part of the flowchart of FIG. 5A.
Figure 5D:
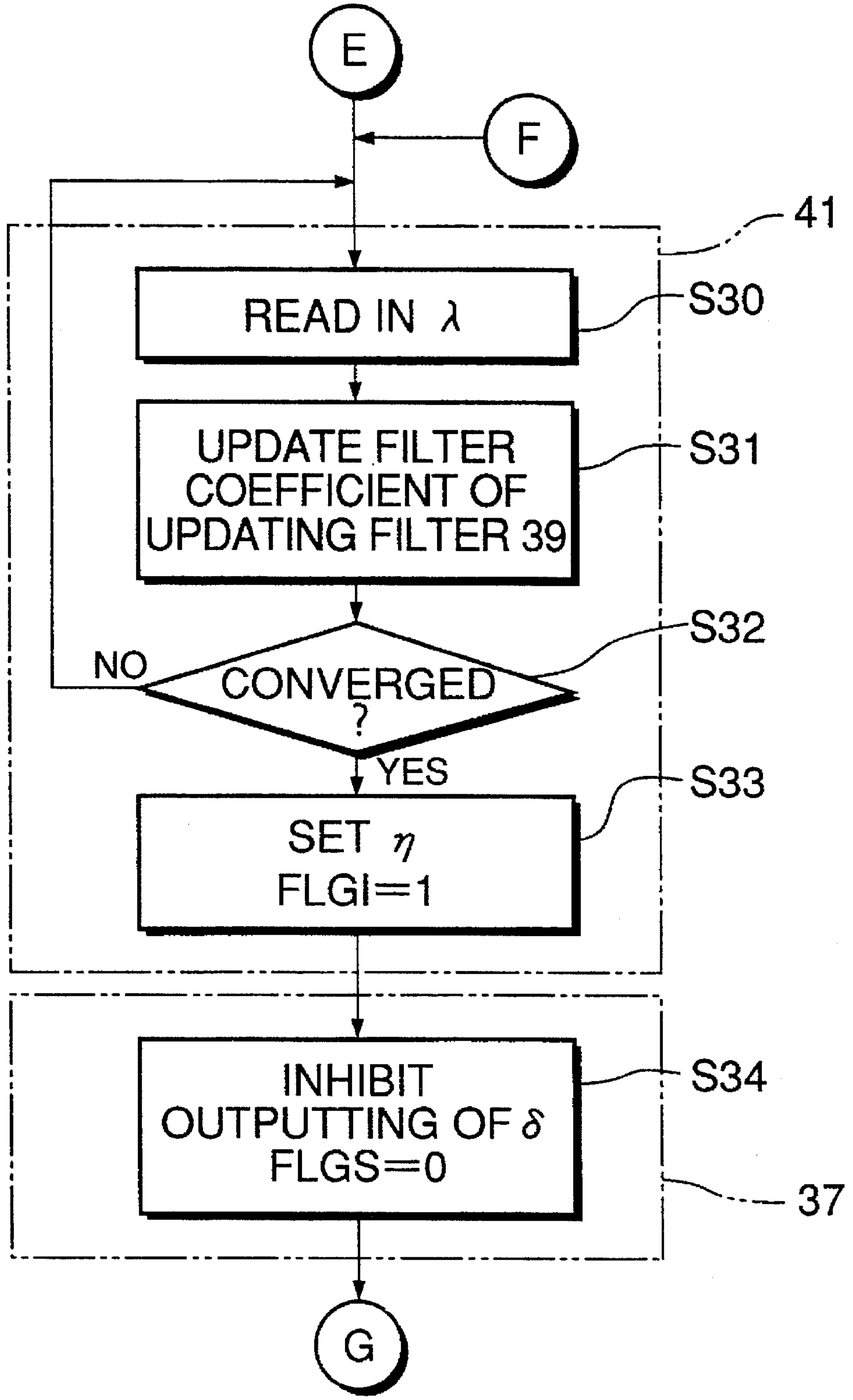
FIG. 5D is a continued part of the flowchart of FIG. 5A.

If the program proceeds to the step S20 in FIG. 5B, the adaptive control is executed again by the adaptive control circuit 19. More specifically, the control LMS processor 29 reads the error signal ϵ from the vibration error sensor 9 at the step S20, and then the filter coefficient of the W filter 26 is updated based on the error signal ϵ, the reference signal R, and a present value of the first control signal Q, at a step S21, to thereby set a value of the first control signal Q to be output upon inputting of the next pulse of the timing pulse signal Y. The thus set first control signal Q value is stored into the memory (RAM) incorporated in the W filter 26, at a step S22. Thereafter, the program returns to the step S20 to continue execution of the processing at the steps S20 to S22 until the next pulse of timing pulse signal Y is input. Upon inputting of the next timing pulse signal Y pulse the operation executed at the steps S20 to S22 is terminated, followed by the program returning to the step S1.

Thus, when the identifying operation is inhibited, the adaptive control is continuously executed by the adaptive control circuit 19, at least until the next pulse of the timing pulse signal Y is input.

When the identifying operation is permitted, the program proceeds to the step S14, wherein it is determined whether or not the flag FLGS is set to "1" If the flag FLGS is set to "0", which means that the identifying reference sine wave signal δ is not output from the identifying reference signal-generating block 37, steps S23 to S28 are executed by the identifying frequency-calculating block 36 to carry out the identifying operation.

At the step S23, an updating history, i.e. information on past updated values is read from the transfer characteristic-updating block 42, and then a sensitivity dynamic factor table, not shown, is retrieved to calculate a sensitivity dynamic factor SF. The sensitivity dynamic factor SF is employed to multiply the identifying frequency FREQ by the factor SF to generate the identifying reference sine wave having such a large S/N ratio that the reference sine wave is not sensed by the passenger. The sensitivity dynamic factor table is set such that predetermined values of the sensitivity dynamic factor SF are provided in a manner corresponding to predetermined values of the identifying frequency FREQ. A value of the sensitivity dynamic factor SF corresponding to the identifying frequency FREQ is read from the sensitivity dynamic factor table, or calculated by interpolation if necessary.

More specifically, since the vibration error sensor 9 is arranged in the vicinity of the engine mount 2*b*, as shown in FIG. 1, there is a fear that the error signal ϵ detected by the vibration error sensor 9 is amplified and transmitted to the location of the passenger within the compartment. That is, when resonance occurs between the frequency of vibration corresponding to the present engine rotational speed and the detected error signal ϵ, in the area between the vibration error sensor 9 and the seating position of the passenger within the compartment, the error signal ϵ is amplified due to the resonance. Therefore, an upper limit value has to be provided for the amplitude of the reference sine wave having the identifying frequency FREQ. To this end, the amplitude of the transfer characteristic formed along the path between the vibration error sensor 9 and at least one passenger seating position (predetermined area) within the compartment, i.e. the sensitivity dynamic factor is empirically measured for each frequency beforehand, and values of the sensitivity dynamic factor SF for the respective frequency values are stored as the sensitivity dynamic factor table. Thus, by reading the thus stored sensitivity dynamic factor, the amplitude of the reference sine wave signal δ having the maximum S/N ratio is determined such that the signal δ is not sensed by the passenger.

At the step S25, a present value NE(n) of the engine rotational speed is read to calculate the avoiding frequency AF.

More specifically, vibrations and noises generated by the engine 1 are expressed in the form of waveforms corresponding to the vibration orders to be controlled. However, particular vibration order components (e.g. first vibration order component) of the frequency corresponding to the present rotational speed of the engine 1 (e.g. the primary vibration component) are too large in level such that accurate identification cannot be effected. Therefore, to eliminate the frequency and an n-fold frequency (n: integer) thereof from the identifying frequency FREQ, the avoiding frequency AF is calculated. Specifically, a calculation is made of a frequency n times as high as that of the 0.5th order vibration component of the present rotational speed of the engine, as the avoiding frequency AF.

The reason why the frequency n times as high as that of the 0.5th order vibration component of the present NE value is eliminated is as follows:

In a four-stroke cycle engine, the piston system makes one reciprocating motion per one rotation of the crankshaft, and accordingly vibration (exciting force) of the piston system occurs once per one rotation of the crankshaft. One intake stroke and one exhaust stroke take place per one rotation of the camshaft, i.e. per two rotations of the crankshaft for each cylinder, and accordingly an exciting force due to the reciprocating mass of the valve operating system is generated once per one rotation of the camshaft, i.e. two rotations of the crankshaft. Further, one explosion stroke takes place per one rotation of the camshaft, i.e. per two rotations of the crankshaft, and accordingly an exciting force due to the explosion pressure within the cylinder is generated once per two rotations of the crankshaft. That is, in a four-stroke cycle engine, the vibration/noise characteristics can be expressed such that vibration is generated once per two rotations of the crankshaft. Therefore, all the vibrations and noises ascribable to the engine rotation can be expressed as having the 0.5th vibration order as the basic order component. Therefore, the frequency n times as high as that of the 0.5th order vibration component of the present engine rotational speed is calculated and stored as the avoiding frequency AF, i.e. the frequency of a particular order vibration having such a high level that accurate identification cannot be effected. In the present embodiment, when the variation amount $\Delta NE$ is below the predetermined value NEX, the identifying operation is carried out even if a small engine variation occurs. Therefore, it is preferable that not only the frequency just corresponding to the particular order vibration component but also frequencies within a small range about the same should be calculated and treated as the avoiding frequency AF. Further, in the case of a rotating object other than a four-stroke cycle cylinder engine, a frequency corresponding to the present rotational speed of the rotating object and a frequency n times as high as the former should be calculated as the avoiding frequency AF.

Then, at a step 26, an identifying gain constant G is calculated based on the noise signal level from the disturbance noise sensor 11 and the sensitivity dynamic factor SF. More specifically, with disturbance noises as well as the sensitivity dynamic factor SF taken into account, the gain constant G, e.g. such a value as to lower the level of the reference sine wave signal $\delta$ by 20 dB relative to the error signal $\delta$, is calculated so that the maximum S/N ratio is set within a range at which the reference sine wave signal $\delta$ is not sensed by the passenger within the compartment. To prevent the reference sine wave signal $\delta$ from being sensed by the passenger within the compartment, it is preferable that the gain constant G is increased or decreased by effecting a window processing at the start and end of outputting of the reference sine wave signal $\delta$.

After the avoiding frequency AF is thus calculated, the identifying frequency FREQ is set based on the avoiding frequency AF and the updating record of the identifying frequency up to the last loop, at a step S27. More specifically, the identifying frequency FREQ to be used for the identification in the present loop is determined to a frequency other than the avoiding frequency AF and a frequency updated a predetermined number (e.g. 100) of loops before the present loop by referring to the updating record of the past values of the frequency, which is recorded in the transfer characteristic-updating block 42, as referred to hereinafter. In other words, it is desirable to avoid that the frequency updated concentrates on a specific frequency, as far as possible, to thereby select the identifying frequency from a frequency in an unidentified frequency region, and therefore the identifying frequency FREQ is calculated to a frequency other than not only the avoiding frequency AF but also the frequency updated the predetermined number of loops before the present loop. Further, in the calculation of the identifying frequency FREQ, it is desirable to additionally provide a weighting table for weighting the frequency of updating for each region of the engine rotational speed and for weighting the updating of the identifying frequency in regions of frequencies at which the transfer characteristic can easily change due to a change in the temperature, etc.

Then, at a step S28, the identifying amplitude AI is set based on the gain constant G.

Next, based on the identifying frequency FREQ set at the step S27 and the identifying amplitude AI set at the step S28, the identifying reference sine wave signal $\delta$ is determined and output from the identifying reference signal-generating block 37. Then, the step 30 et seq. are executed to carry out the identifying processing.

On the other hand, if the answer at the step S14 is affirmative (YES), i.e. if the identifying reference sine wave signal $\delta$ has been output from the identifying reference signal-generating block 37, the program proceeds to the step S30 to carry out the identifying processing.

At the step S30, the difference signal $\lambda$ from the adder 40 is read in and the difference signal $\lambda$, the identifying reference sine wave signal $\delta$, and the identifying delayed sine wave signal $\gamma$ delayed in phase by ¼ of the repetition period relative to the identifying reference sine wave signal $\delta$ are input to the identifying LMS processor 41. Then, the filter coefficient of the identifying filter 39 is updated based on these signals. It is determined at a step S32 whether or not the convergence of the adaptive control has been obtained, and if the convergence has not been obtained, the program returns to the step S30, whereas if the convergence has been obtained, the program proceeds to a step S33. The determination as to whether or not convergence has been obtained is made, e.g. by determining whether or not variation rates in the filter coefficients C(1) and C(2) of the identifying filter 39 are smaller than 2%. If the convergence has been obtained, the identification signal $\eta$ is set, and at the same time the flag FLGI is set to "1" to indicate that the identification has been completed. Then, a command is issued to the identifying reference signal-generating block 37 to inhibit outputting of the identifying reference sine wave signal $\delta$, and at the same time the flag FLGS is set to "0", at a step S34, followed by the program returning to the step S1. In the present vibration/noise control system, since the identification is carried out based on the identifying filter 39 having two taps, a predetermined number of waves of the reference sine wave signal may be set beforehand, and the identification signal $\eta$ may be output when the predetermined number of waves of the reference sine wave signal are subjected to the identification, thus omitting the convergence determination.

As noted above, the identifying delayed sine wave signal is delayed in phase by ¼ of the repetition period relative to the identifying sine wave signal. This is because the convergency of the identification is extremely degraded if two sine waves with the same phase are employed, the reason for which will be described hereinbelow. The following description refers to the identifying sine wave signal alone, which, however, will be applicable to the control sine wave signal:

The identifying filter 39 is adapted to change the phase and amplitude of a sine wave input thereto, as desired. An input signal S(n) to the filter 39 can be expressed by discrete representation, by the use of the following equation (3):

$$S(n)=\sin kn=Im(e^{jkn}) \tag{3}$$

where n represents a discrete time signal, k=2π/N (N=the number of pulses of the variable sampling pulse signal Psr), and Im an imaginary part. If the imaginary part is omitted for the convenience sake, the input signal S(n) is expressed by the following equation (4):

$$S(n)=e^{jkn} \tag{4}$$

Further, an input signal S'(n) delayed in phase by a delay φ relative to the input signal S(n) is expressed by the following equation (5):

$$S'(n)=e^{j(kn+\phi)} \tag{5}$$

The input signal S'(n) is subjected to the adaptive control by the identifying filter 39 having two taps, and hence assuming that a first filter coefficient of the identifying filter 39 is represented by C(1), and a second filter coefficient of the same by C(2), the input signal S'(n) is expressed by the following equation (6):

$$S'(n)=C(1)\times S(n)+C(2)\times S(n-1) \tag{6}$$

Therefore, by substituting the equations (4) and (5) into the equation (6), the following equation (7) is obtained, and further from the equation (7), the following equation (8) is derived:

$$e^{j(kn+\phi)} = C(1)\times e^{jkn} + C(2)\times e^{jk(n-1)} \tag{7}$$

$$\begin{aligned} e^{j\phi} &= C(1)+C(2)\times e^{-jk} \\ &= (C(1)+C(2)\cos k) - jC(2)\sin k \end{aligned} \tag{8}$$

The equation (8) represents the relationship between the first and second filter coefficients C(1) and C(2) of the identifying filter 39 having the delay φ in phase relative to the input signal S(n), and k (=(2π/N)). Conditions of the amplitude of the control signal determined by the first and second filter coefficients C(1) and C(2) should be satisfied that an elliptic locus is formed on a C plane as can be understood from the following equation (9), while conditions of the phase should be satisfied that a linear locus is formed as can be understood from the following equation (10):

$$(C(1)+C(2)\cos k)^2+C(2)^2\sin^2 k=1 \tag{9}$$

$$\tan\phi=-C(2)\sin k/(C(1)+C(2)\cos k) \tag{10}$$

Figure 6A:
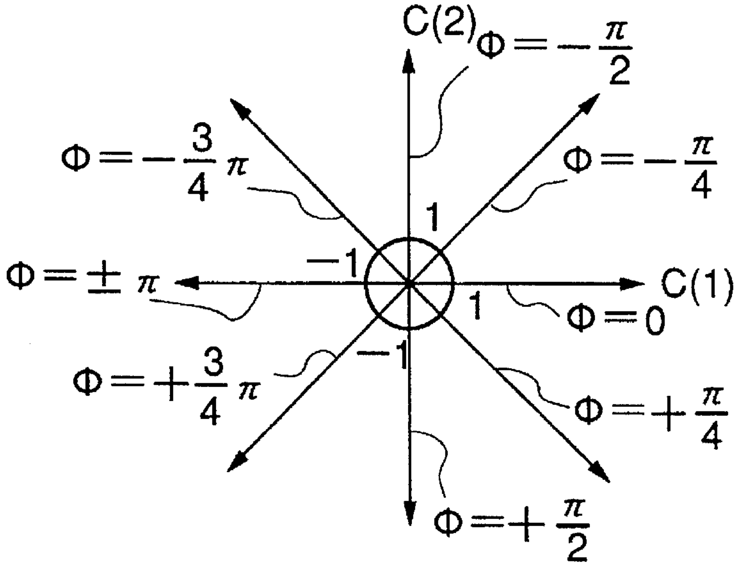
FIGS. 6A to 6C are diagrams useful in explaining a ground for defining the range of a delay period M of a sine wave signal generated according to the first embodiment.
Figure 6B:
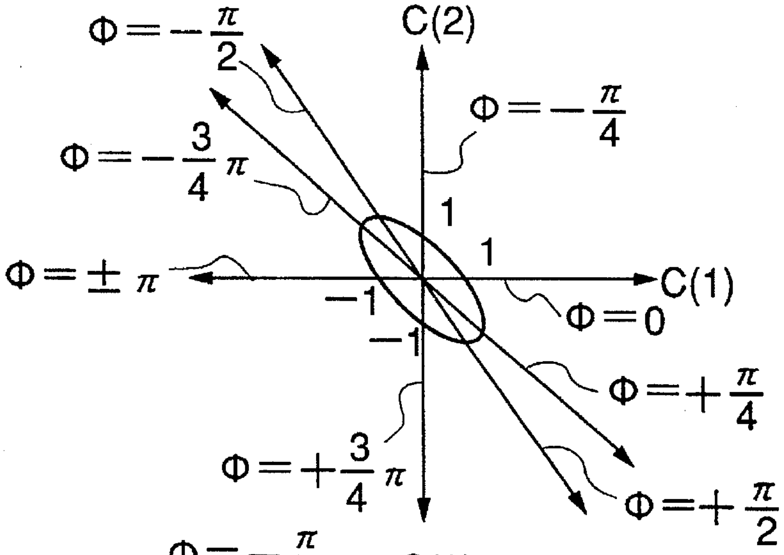
Figure 6C:
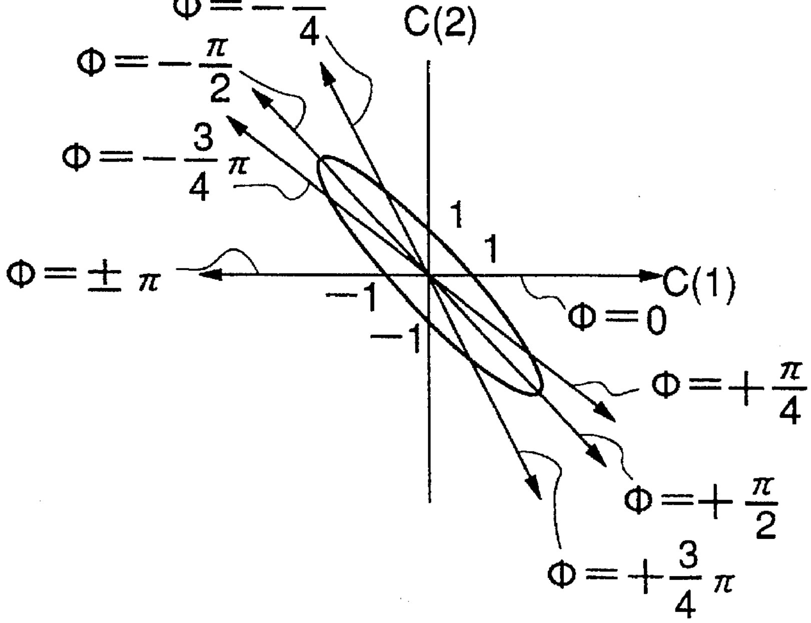

FIGS. 6A to 6C show the relationships between a delay period M by which the identifying delayed sine wave signal is delayed and equi-amplitude ellipsis and equi-phase straight line (delay φ in phase=0, ±π/4, ±π/2, ±π¾, ±π). The abscissa represents the first filter coefficient C(1) and the ordinate the second filter coefficient C(2). FIGS. 6A to 6C show cases of the delay period M being equal to ¼, ⅛, and 1/16, respectively.

As is clear from FIGS. 6A to 6C, the locus of the equi-amplitude ellipse forms a perfect circle when the delay period M is equal to ¼. On the other hand, when the delay period M becomes smaller than ¼, i.e. when the delay period decreases, the locus forms an ellipse having a major axis extending in the quadrant II and the quadrant IV. The ratio of the major axis to the minor axis becomes larger as the delay period M decreases. Although not illustrated, when the delay period M becomes larger than ¼, i.e. when the delay period increases, an ellipse having a major axis extending in the quadrant I and the quadrant III is formed.

On the other hand, with respect to the locus of the equi-phase straight line, when the delay φ in phase is always equal to "0" or ±"π" and hence there is no actual delay φ in phase, the equi-phase straight line always coincides with the X-axis indicative of the first filter coefficient C(1). However, when the delay period M becomes larger than ¼, the other three equi-phase straight lines (φ=±π/4,±π/2,±π¾) becomes closer to the major axis of the ellipse extending in the quadrant II and the quadrant IV, and hence it can be understood that it becomes difficult to converge the adaptive control. Further, although not illustrated, when the delay period M becomes smaller than 4, the equi-phase straight line becomes closer to the major axis of an ellipse extending in the quadrant I and the quadrant III, and hence again it becomes difficult to converge the adaptive control.

As is understood from the above, if two sine wave signals with the same phase or close phases are employed, it becomes difficult to converge the adaptive control. On the other hand, if the identifying reference sine wave signal having a single repetition period and the delayed sine wave signal delayed in phase by the predetermined period M (¼) are employed, the locus of the amplitude forms a perfect circle, and even when there is the delay φ in phase, the equi-phase straight line extends evenly in the quadrants I to IV, resulting in the optimal adaptive control. Further, one of the two taps of the adaptive digital filter has its coefficient updated based on the reference sine wave signal δ, and the other of the two taps based on the delayed sine wave signal γ, respectively. Even if the delay period M is set to a value within a range of ⅓≧M≧1/7 (M is a real number), good adaptive control can be achieved although the convergency on such an occasion is slightly degraded relative to the case where the delay period M is set to ¼.

Figure 7:
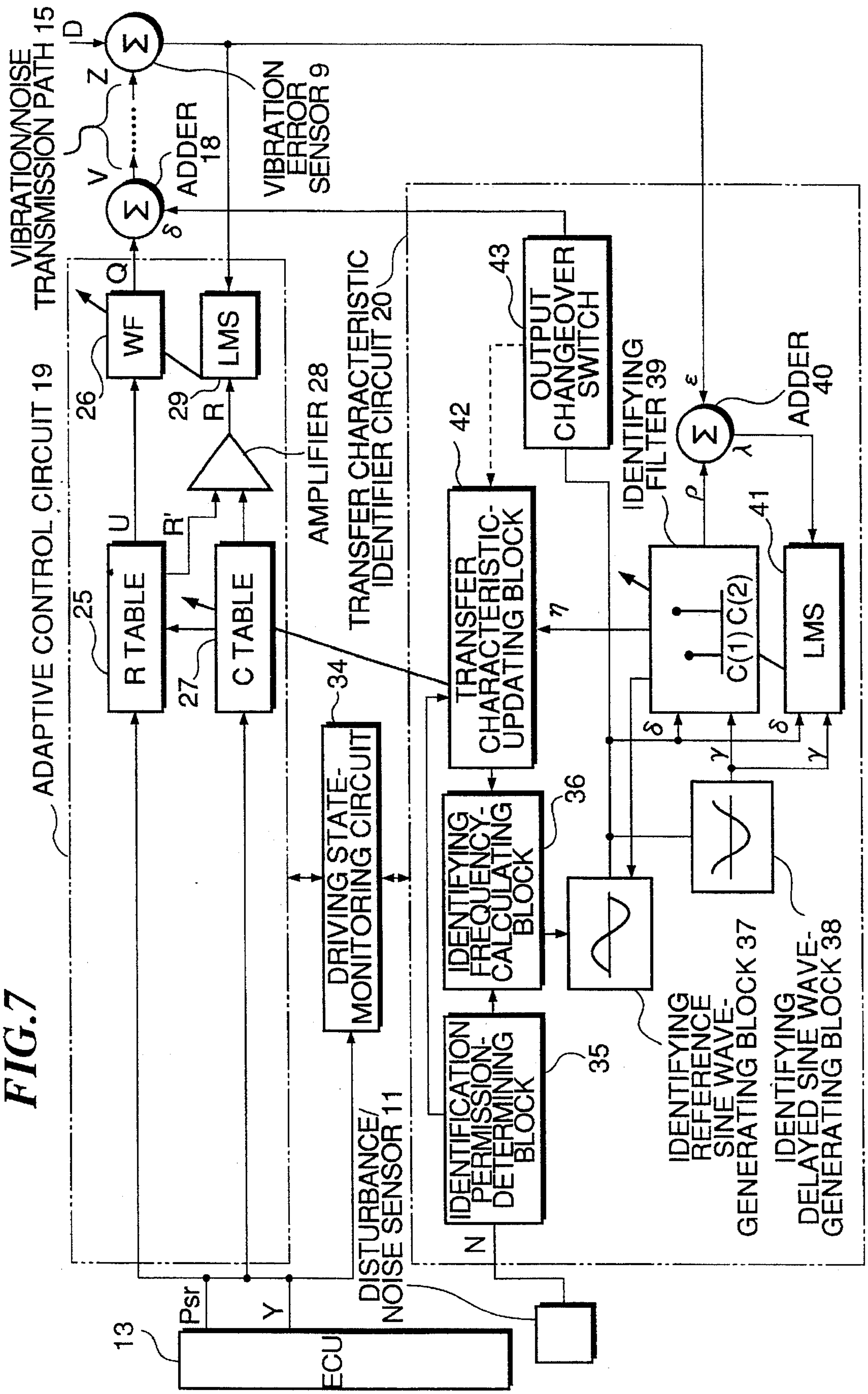
FIG. 7 is a block diagram schematically showing the arrangement of an adaptive control processor employed in a second embodiment of the invention.

FIG. 7 schematically shows the arrangement of a transfer characteristic identifier circuit 20 employed in a second embodiment of the invention, together with an adaptive control circuit 19 thereof. The second embodiment is distinguished from the first embodiment, only in that an output changeover switch 43 (superposition control means) is further added to the transfer characteristic identifier circuit 20 in FIG. 4, which controls superposition of the identifying reference sine wave signal δ on the first control signal Q. Further, the switching state of the output changeover switch 43 is notified to the transfer characteristic-updating block 42, from which an optimal identification signal is generated depending on the switching state of the output changeover switch 43. Then, the optimal identification signal is supplied to the C table 27 for updating the phase/amplitude characteristic thereof. Except for these, the second embodiment is identical in construction and arrangement with the first embodiment.

The error signal ε from the vibration error sensor 9 contains not only the identifying sine wave signal δ but also all components input from the environment in which the vehicle is placed. Particularly, when the noise level is low on such an occasion where the engine 1 is in a steady operating condition, a sine wave signal having almost the same level as that of the identifying reference signal may be output from the vibration error sensor 9, resulting in that highly accurate identification cannot be achieved. Therefore, according to the second embodiment, the error signal $\epsilon$ obtained when the output changeover switch 43 is turned off (OFF state) is used to identify the background noise and vibration, and the result of which is compared with an identification result obtained when the output changeover switch 43 is turned on (ON state), to generate the optimal identification signal based on the comparison result.

Figure 8:
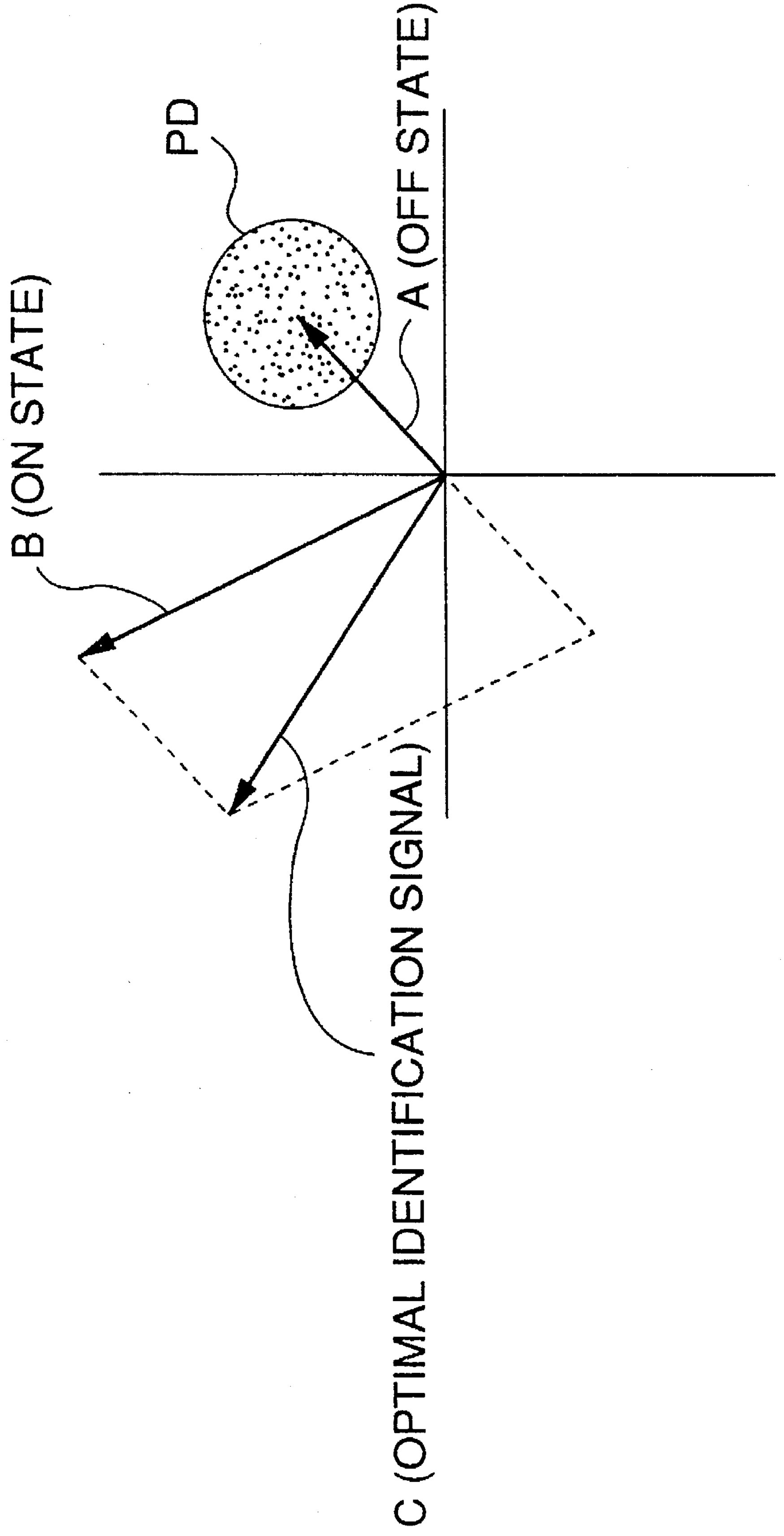
FIG. 8 is a diagram useful in explaining how the adaptive control processor of the second embodiment operates.

More specifically, as shown in FIG. 8, when the output changeover switch 43 is in the OFF state, the identifying reference sine wave signal $\delta$ is not input to the adder 18, and consequently an identification result is obtained, which is based only on disturbances applied to the system. That is, when the output changeover switch 43 is in the OFF state, as indicated by the arrow A in the figure, an identification result is obtained in which the phase and amplitude change with a certain probability distribution PD in a certain direction different from that obtained by an identification result based on the reference sine wave signal. On the other hand, when the output changeover switch 43 is in the ON state, the identifying reference sine wave signal $\delta$ is input to the adder 18, and an identification result based on the identifying reference sine wave signal $\delta$ is obtained, which, however, as indicated by the arrow B in FIG. 8, is different in the changing direction of the phase and amplitude from the OFF-state identification result. The optimal identification signal is obtained by subtracting the OFF-state identification result from the ON-state identification result. In this manner, by means of the output changeover switch 43, it is possible to obtain two identification signals, i.e. the OFF-state and ON-state identification signals, through a single identifying operation by utilizing the high convergence speed of the system, and the optimal identification signal $\eta$ having the optimal phase and amplitude, as indicated by the arrow C, can be generated from the difference between the two identification results Thus, the phase/amplitude characteristic stored in the C table 27 is updated based on the optimal identifying signal, whereby further accurate identification can be achieved.

Figure 9:
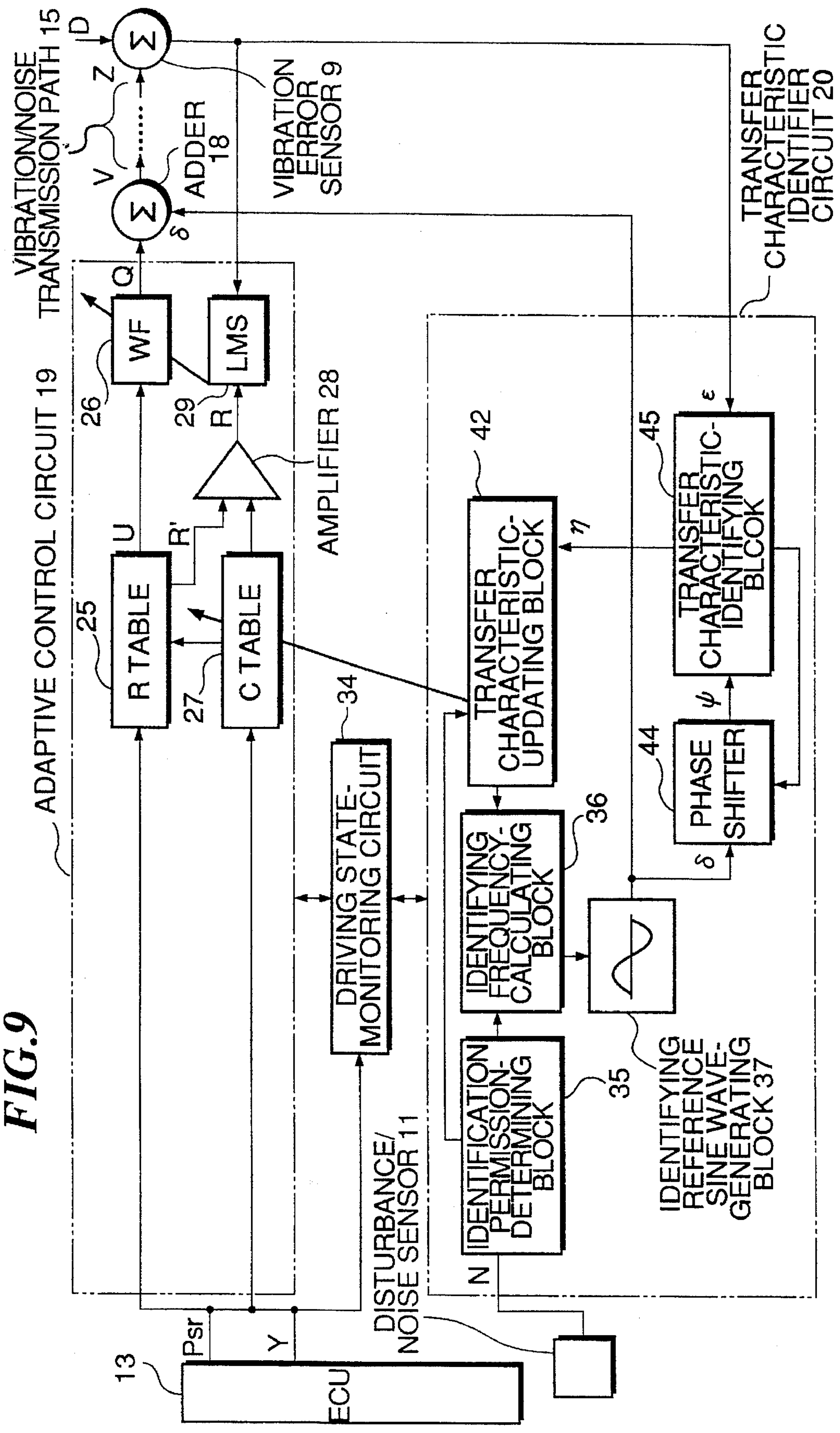
FIG. 9 is a block diagram schematically showing the arrangement of an adaptive control processor employed in a third embodiment of the invention.

FIG. 9 schematically shows the arrangement of a transfer characteristic identifier circuit 20 employed in a third embodiment of the invention, together with an adaptive control circuit 19 thereof. The third embodiment is distinguished from the first and second embodiments, only in that, in place of employment of the identifying filter having two taps for identification in the first and second embodiments, the identifier circuit 20 employs a phase shifter 44 for changing the phase of the reference sine wave generated by the identifying reference signal-generating block 37, and a transfer characteristic-identifying block 45 (transfer characteristic-identifying means) for identifying the transfer characteristic, based on a reference signal (modulated sine wave) $\psi$ output from the phase shifter 44, and the error signal $\epsilon$. According to the third embodiment, the phase/amplitude characteristic stored in the C table 27 is updated by the transfer characteristic-updating block 42, similarly to the first and second embodiment, but based on the identification signal obtained by the transfer characteristic-identifying block 45.

The third embodiment is an application of a conventionally known lock-in identification method, i.e. a method of measuring a feeble signal hidden in noise, to identification of the vibration/noise transfer characteristic by the vibration/noise control system.

According to the lock-in identification method, an identification signal (phase/amplitude signal=sine wave signal) to be detected, i.e. an error component in the error signal $\epsilon$ from the vibration error sensor 9 is multiplied by the modulated reference signal $\psi$ which has the same frequency as that of the identifying driving signal and can have its phase changed as desired, to thereby take out a signal having a modulated frequency component, i.e. a phase/amplitude signal, from the error signal.

The principle of the identification method according to the third embodiment will be described in detail hereinbelow:

According to the present vibration/noise control system of the present embodiment, the identifying sine wave signal $\delta$, the modulated reference signal $\psi$, and the error signal $\epsilon$ are expressed by the following equations (11) to (13):

$$\delta(t)=a_1 \cos(\omega_0 t) \tag{11}$$

$$\psi(t)=a_2 \cos(\omega_0 t+\phi r) \tag{12}$$

$$\epsilon(t)=a_3 \cos(\omega_0 t+\phi s) \tag{13}$$

where $a_1$ to $a_3$ represent respective amplitude values of the identifying sine wave signal $\delta$, the modulated reference signal $\psi$, and the error signal $\epsilon$. $\phi r$ and $\phi s$ represent phase differences from the identifying sine wave signal $\delta$.

The multiplication of the error signal $\epsilon$ and the modulated reference signal $\psi$ is expressed by the following equation (14):

$$\begin{aligned}\phi(n)\times\epsilon(n) &= a_2a_3\cos(2\omega_0 t+\phi r)\cos(\omega_0 t+\phi s)= \\ &\quad 1/2\times a_2a_3\cos(\phi r-\phi s)+ \\ &\quad 1/2\times a_2a_3\cos\{\omega_0 t+(\phi r+\phi s)\}\end{aligned} \tag{14}$$

The first term of the equation (14) represents a direct current component, and the second term an alternating current component vibrating with a frequency $2\omega_0$. Next, the equation (14) is subjected to integration, and then to time averaging. If an integrating time period T which is set to an extremely large value is employed, the following equation (15) is obtained:

$$\begin{aligned} y &= \lim_{T\to\infty}\frac{1}{T}\int_0^T \frac{1}{2}\, a_2 a_3 \cos(\phi r-\phi s)\, dt + \\ &\quad \lim_{T\to\infty}\frac{1}{T}\int_0^T \frac{1}{2}\, a_2 a_3 \cos\{2\,\omega_0 t+(\phi r+\phi s)\}\, dt \\ &= \frac{1}{2}\, a_2 a_3 \cos(\phi r-\phi s)=\frac{1}{2}\, a_2 a_3 \cos(\phi s-\phi r)\end{aligned} \tag{15}$$

Thus, a signal with the same frequency as that of the modulated reference signal $\psi$ (reference sine wave signal $\delta$) can be taken out from the error signal $\epsilon$ from the vibration error sensor 9, as a direct current component, whereby amplitude information of the signal to be detected can be obtained.

On the other hand, the error signal $\epsilon$ from the vibration error sensor 9 contains components of vibrations and noises (noise signal) from the road surface and the engine 1. The noise signal generally is different in frequency from the reference sine wave signal $\delta$. The noise signal $\nu$ is expressed by the following equation (16):

$$\nu(t)=a_4 \cos(\omega_1 t+\phi n) \tag{16}$$

If the noise signal $\nu$ is multiplied by the modulated reference signal $\psi$, the result can be expressed by the following equation (17):

$$\phi(t)\times\epsilon(t) = a_2\cos(\omega_0 t+\phi r)a_4\cos(\omega_1 t+\phi n) = 1/2\times a_2a_4[\cos\{(\omega_1-\omega_0)t+(\phi n-\phi r)\}+\cos\{(\omega_1+\omega_0)t+(\phi n+\phi r)\}] \quad (17)$$

As is learned from the above equation, an alternating current component having two kinds of frequency components $(\psi_1-\omega_0)$ and $(\omega_1+\omega_0)$ can be obtained.

Next, similarly to the equation (15), the equation (17) is subjected to integration, and then to time averaging using the integrating time period T set to an extremely large value, to obtain the following equation (18):

$$z = \lim_{T\to\infty}\frac{1}{T}\int_0^T \frac{1}{2}a_2a_4\cos\{(\omega_1-\omega_0)t+(\phi r-\phi s)\}\,dt + \lim_{T\to\infty}\frac{1}{T}\int_0^T \frac{1}{2}a_2a_4\cos\{(\omega_1+\omega_0)t+(\phi r+\phi s)\}\,dt = 0 \quad (18)$$

Thus, it will be learned that the noise signal with a frequency component different from that of the modulated reference signal $\psi$ (reference sine wave signal $\delta$) has been eliminated. That is, by using the equations (15) and (18), a signal with the same frequency as that of the reference sine wave signal $\delta$ is taken out as a direct current signal from the error signal $\epsilon$ from the vibration error sensor 9, to thereby obtain the amplitude information, whereas the noise signal $\nu$ with a frequency different from that of the reference sine wave signal $\delta$ is eliminated.

In the above-mentioned equations (15) and (18) the integrating time period T is set to infinity. However, if the frequency component $\omega_1$ of the noise signal $\nu$ is very different from the frequency k of the modulated reference signal $\psi$ (or the reference sine wave signal $\delta$), the integrating time period T may be set to a smaller value to achieve highly accurate detection.

Then, based on the thus obtained amplitude information y free of the noise signal $\nu$, calculations are made of an amplitude characteristic a and a phase characteristic $\phi$ to be used for the identification. The amplitude characteristic a represents the ratio of the amplitude $a_3$ of the error signal $\epsilon$ to the amplitude $a_1$ of the identifying sine wave signal $\delta$, and the phase characteristic $\phi$ the phase of the error signal $\epsilon$ relative to the identifying sine wave signal $\delta$.

First, to obtain the amplitude characteristic a and the phase characteristic $\phi$, a value of the phase $\phi r$ of the modulated reference signal $\psi(n)$ at which the amplitude information y becomes the maximum is calculated.

At the present discrete time signal n, the aforegiven equation (15) can be converted into the following equation (19):

$$y(n)=\tfrac{1}{2}a_2a_3\cos(\phi s-\phi r(n)) \quad (19)$$

As is understood from the equation (15), the amplitude information y becomes the maximum when the difference between the phase $\phi s$ of the error signal $\epsilon(n)$ and the phase $\phi r$ of the modulated reference signal $\psi(n)$ is zero. The phase $\phi s$ of the error signal $\epsilon(n)$ shows a constant value, and therefore the phase $\phi r$ of the modulated reference signal $\psi(n)$ is modulated by the phase shifter 44.

At the next discrete time signal (n+1), the equation (15) is expressed by the following equation (20), and a phase value $\phi r(n+1)$ and a phase value $\phi r(n)$ are in the relationship expressed by the following equation (21):

$$y(n+1)=\tfrac{1}{2}\times a_2a_3\cos(\phi s-\phi r(n+1)) \quad (20)$$

$$\phi r(n+1)=\phi r(n)+\Delta\phi r \quad (21)$$

Then, a variation rate $\Delta y(n)$ of the amplitude information y(n) dependent on the phase $\phi r(n)$ of the modulated reference signal $\psi$ can be calculated by the use of the following equation (22):

$$\Delta y = \frac{y(n+1)-y(n)}{\phi r(n+1)-\phi r(n)} = \frac{y(n+1)-y(n)}{\Delta\phi r(n)} = \frac{a_2a_3}{2\Delta\phi r(n)}\{\cos(\phi s-\phi r(n+1)) - \cos(\phi s-\phi r(n))\} \cong -\frac{1}{2}a_2a_3\sin(\phi s-\phi r(n)) = \frac{\partial y}{\partial\phi r(n)} \quad (22)$$

Figure 10:
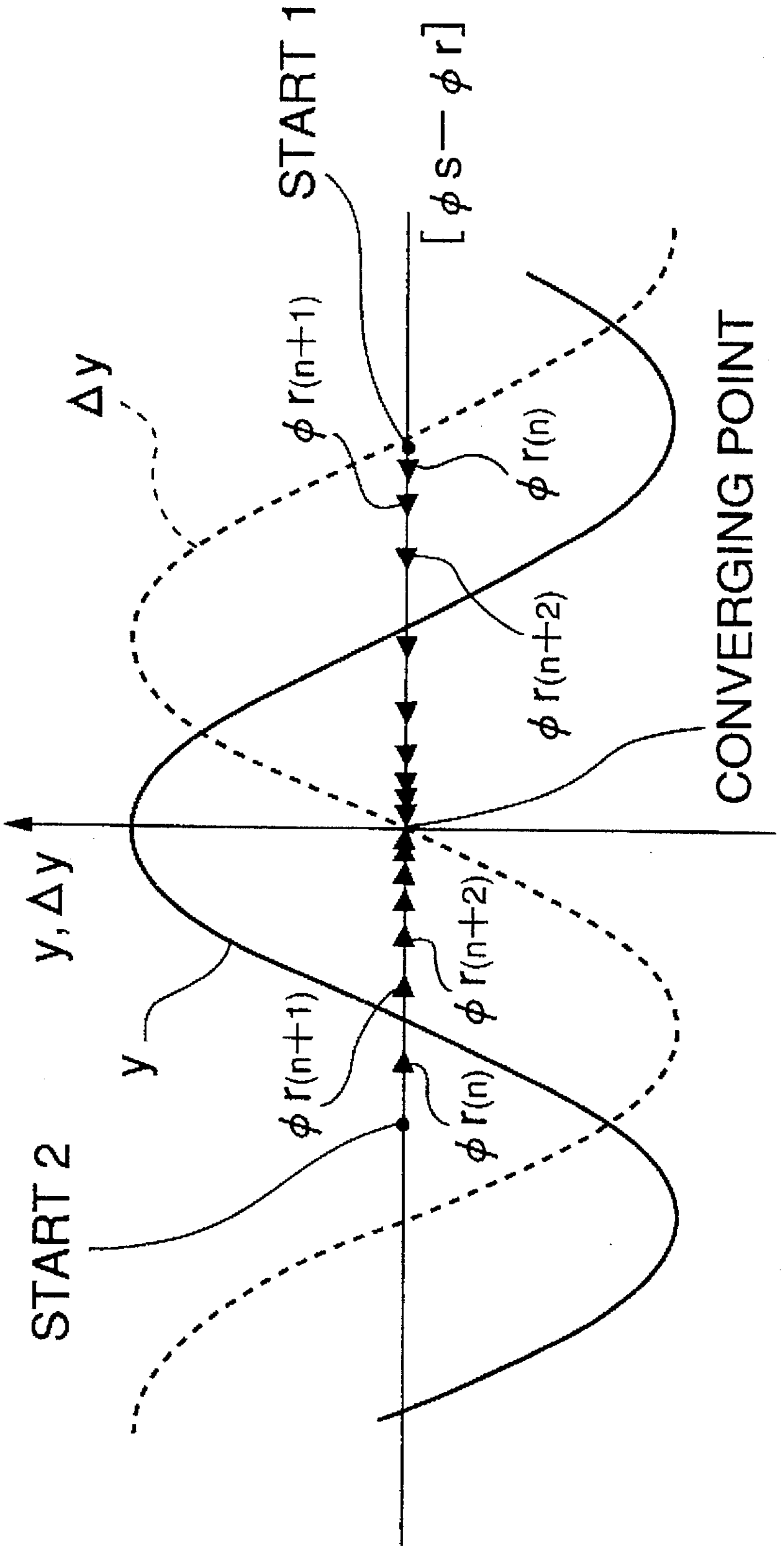
FIG. 10 is a graph useful in explaining how the transfer characteristic of the path converges, according to the third embodiment.

In short, the variation rate $\Delta y(n)$ is a result obtained by partial-differentiating the amplitude information y(n) by the phase $\phi r(n)$. The values $(\phi s-\phi r)$, y(n) and $\Delta y(n)$ are in the relationship as shown in FIG. 10.

While the initial value of the phase $\phi r(n)$ is determined by the equation (21), the same phase is successively modulated by the phase shifter 44 based on the following equation (23), in a feedback manner that the modulated or shifted phase value is fed back to the phase shifter 44, until the amplitude information y is converged:

$$\phi r(n+1)=\phi r(n)+\mu\Delta y(n) \quad (23)$$

where $\mu$ represents a step-size parameter.

As the phase of the modulated reference signal $\psi$ is successively modulated by the value $\mu\Delta y$, the phase $\phi r$ of the modulated reference signal $\psi$ approaches by the value $\mu\Delta y$ from either of the right and left sides toward the converging point, as shown in FIG. 10. When the amplitude y(n) reaches the maximum, the variation rate $\Delta y(n)$ becomes zero according to the equation (22), whereby the amplitude y(n) is converged to the maximum value, irrespective of the initial value of the phase $\phi r(n)$. Therefore, the following equation (24) holds, and the amplitude characteristic a and the phase characteristic b can be obtained from the following equations (25) and (26):

$$y(n)max=a_1a_3/2 \quad (24)$$

$$a=a3/a1=2y(n)/a1a3 \quad (25)$$

$$\phi=\phi r \quad (26)$$

Thus, it is understood that the phase/amplitude characteristic (transfer characteristic) of the transmission path can be identified based on the modulated reference signal $\psi$ (n) whose phase has been modulated by the phase shifter 44, and the error signal $\epsilon$ (n).

According to the third embodiment, similarly to the first and second embodiments, when the identification permission is made by the driving condition-monitoring circuit 34 and the identification permission determining-block 35, the avoiding frequency AF and the past updating record stored in the transfer characteristic-updating block 42 are referred to by the identification frequency-calculating block 36 to calculate the identifying frequency FREQ. Then, the identifying reference sine wave signal $\delta$ is generated by the identifying reference signal-generating block 37, with the sensitivity dynamic factor SF and the disturbance noise signal N taken into account, and the thus generated identifying reference sine wave signal $\delta$ is input to the adder 18. At the same time, the identifying reference sine wave signal $\delta$ is also input to the phase shifter 44, wherein the signal $\delta$ is modulated into the modulated reference signal ψ. The modulated reference signal ψ from the phase shifter 44 and the error signal ε are input to the transfer characteristic-identifying block 45, wherein the transfer characteristic is identified according to the above described lock-in identification method. More specifically, the phase φr of the modulated reference signal ψ is successively modulated by the phase difference μΔy, and the thus modulated reference signal ψ is input to the transfer characteristic-identifying block 45, by which the lock-in identification is carried out, and the identification result is delivered to the transfer characteristic-updating block 42 as the identification signal η. Thereafter, the C table 27 is updated based on the thus determined identification signal η.

In this manner, according to the present embodiment, the phase/amplitude information of the vibration/noise transmission system 15 can be updated without the use of the identifying filter and the identifying LMS processor, according to a change due to aging and a change in the environment.

The present invention is not limited to the above described embodiments. For example, in the above described embodiments, the vibration/noise control system according to the invention is applied to a single channel system in which a single self-expanding engine mount 2*a* and a single disturbance noise sensor 11 are employed. However, the vibration/noise control system according to the invention may be applied to a multiple channel system in which two or more of each of the above component parts are employed. Further, in the above embodiments, the transfer characteristic is identified over the operation-null time period during which the control LMS processor 29 of the adaptive control circuit 19 is not operative, to curtail the manufacturing cost. However, it goes without saying that a controller for exclusive use in identifying the transfer characteristic may be additionally provided for the system.

Moreover, in the above described embodiments, the C table 27 is employed as reference signal-generating means, and the phase/amplitude information of the C table 27 is updated. However, a C filter formed of a normal type FIR adaptive digital filter (ADF) may be employed, instead. In this alternative, a frequency region conversion table is additionally provided, and the coefficient of the C filter is subjected to inverted-Fourier transform, to thereby update the coefficient of the frequency region conversion table. Thus, a desired transfer characteristic of the transmission path can be obtained. Further, in this alternative, the calculation burden is large due to the inverted-Fourier transform. Therefore, a determining block for determining the conversion degree of the C filter is additionally provided, and the identification result is preserved by the transfer characteristic-updating block 42 until the determining block determines that the filter coefficient of the C filter assumes a suitable value, i.e. has converged After the convergence of the C filter coefficient is obtained, the filter coefficient thus obtained is subjected to inverted-Fourier transform to replace the filter coefficient by the resulting coefficient value. Thus, the transfer characteristic can be identified in an efficient manner.

What is claimed is:

1. A vibration/noise control system for controlling vibrations and noises generated with a periodicity or a quasi-periodicity from a vibration/noise source having at least one rotating member, comprising:

timing pulse signal-detecting means for detecting at least one timing pulse signal exhibiting a period of vibrations and noises peculiar to at least one component part of said vibration/noise source;

control signal-generating means for generating a control signal for controlling said vibration/noise source;

electromechanical transducer arranged in at least one of a plurality of vibration/noise transmission paths through which said vibrations and noises from said vibration/noise source transmit;

driving signal-generating means for generating a driving signal for driving said electromechanical transducer;

error signal-detecting means for detecting an error signal exhibiting a difference between said driving signal and said vibrations and noises from said vibration/noise source;

reference signal-generating means for storing a transfer characteristic of a portion of said at least one vibration/noise transmission path extending between said control signal-generating means and said error signal-detecting means, and for generating a reference signal based on said transfer characteristic and said timing pulse signal;

control signal-updating means for updating said control signal such that said error signal is minimized, based on said error signal, said reference signal and said control signal;

reference sine wave-generating means for generating a reference sine wave superposed on said control signal for driving said electromechanical transducer;

delayed sine wave-generating means for generating a delayed sine wave which is delayed by a predetermined delay period M relative to said reference sine wave;

transfer characteristic-identifying means for identifying said transfer characteristic of said portion of said at least one vibration/noise transmission path, based on said reference sine wave, said delayed sine wave, and said error signal, and for outputting a first identification signal indicative of completion of identification of said transfer characteristic; and transfer characteristic-updating means for updating said transfer characteristic stored in said reference signal-generating means, based on said first identification signal output from said transfer characteristic-identifying means;

wherein said transfer characteristic-identifying means is formed of an adaptive digital filter having two taps;

said predetermined delay period M is set relative to a repetition period of said reference sine wave in a range of $\frac{1}{3} \geqq M \geqq \frac{1}{7}$, wherein M is a real number.

2. A vibration/noise control system as claimed in claim 1, wherein said predetermined delayed period M is set to ¼ of said repetition period of said reference sine wave.

3. A vibration/noise control system as claimed in claim 1, including superposition control means for controlling superposition of said reference sine wave on said control signal, and background noise/vibration identification signal-generating means for identifying a transfer characteristic of a background noise and vibration when said reference sine wave is not superposed on said control signal, and for generating a second identification signal indicative of completion of identification of said transfer characteristic of said background noise and vibration;

and wherein said transfer characteristic-updating means includes identification signal-correcting means for correcting said first identification signal, based on said first identification signal and said second identification signal.

4. A vibration/noise control system as claimed in any of claims 1 to 3, including identifying amplitude-determining means for determining an amplitude value of said reference sine wave generated by said reference sine wave-generating means, based on a sensitivity dynamic factor representative of amplitude of a transfer characteristic of a portion of said at least one vibration/noise transmission path extending between said error signal-detecting means and a predetermined area in said at least one vibration/noise transmission path.

5. A vibration/noise control system as claimed in claim 4, wherein said sensitivity dynamic factor is set such that said amplitude of said transfer characteristic is smaller than an amplitude value of said error signal by a predetermined amount.

6. A vibration/noise control system as claimed in claim 4, wherein said control signal-generating means comprises an adaptive digital filter having two taps.

7. A vibration/noise control system as claimed in claim 4, wherein said transfer characteristic-identifying means and said control signal-updating means are arranged such that arithmetic operations thereof are carried out by a single control block.

8. A vibration/noise control system as claimed in claim 4, including monitoring means for monitoring an operative state of said control signal-updating means, and wherein said monitoring means inhibits said identification permission-determining means from determining said identification permission when an arithmetic operation of said control signal-updating means is executed, and permits said identification permission-monitoring means to determine said identification permission when said arithmetic operation of said control signal-updating means is not executed.

9. A vibration/noise control system for controlling vibrations and noises generated with a periodicity or a quasi-periodicity from a vibration/noise source having at least one rotating member, comprising:

timing pulse signal-detecting means for detecting at least one timing pulse signal exhibiting a period of vibrations and noises peculiar to at least one component part of said vibration/noise source;

control signal-generating means for generating a control signal for controlling said vibration/noise source;

electromechanical transducer arranged in at least one of a plurality of vibration/noise transmission paths through which said vibrations and noises from said vibration/noise source transmit;

driving signal-generating means for generating a driving signal for driving said electromechanical transducer;

error signal-detecting means for detecting an error signal exhibiting a difference between said driving signal and said vibrations and noises from said vibration/noise source;

reference signal-generating means for storing a transfer characteristic of a portion of said at least one vibration/noise transmission path extending between said control signal-generating means and said error signal-storing means, and for generating a reference signal based on said transfer characteristic and said timing pulse signal;

control signal-updating means for updating said control signal such that said error signal is minimized, based on said error signal, said reference signal and said control signal;

sine wave-generating means for generating a sine wave superposed on said control signal for driving said electromechanical transducer means;

phase-changed means for changing a phase of said sine wave;

transfer characteristic-identifying means for identifying said transfer characteristic of said portion of said at least one of said vibration/noise transmission path, based on said sine wave having said phase thereof changed by said phase-changing means, and said error signal, and for outputting a first identification signal indicative of completion of identification of said transfer characteristic; and transfer characteristic-updating means for updating said transfer characteristic stored in said reference signal-generating means, based on said first identification signal output from said transfer characteristic-identifying means.

10. A vibration/noise control system as claimed in claim 9, including superposition control means for controlling superposition of said sine wave on said control signal, and background noise/vibration identification signal-generating means for identifying a transfer characteristic of a background noise and vibration when said sine wave is not superposed on said control signal, and for generating a second identification signal indicative of completion of identification of said transfer characteristic of said background noise and vibration;

and wherein said transfer characteristic-updating means includes identification signal-correcting means for correcting said first identification signal, based on said first identification signal and said second identification signal.

11. A vibration/noise control system as claimed in any of claims 1 to 10, including rotational speed-detecting means for detecting rotational speed of said rotating member, disturbance signal-detecting means for detecting a disturbance noise signal other than a vibration/noise signal generated by said rotating member, and identification permission-determining means for determining whether or not execution of said identification by said transfer characteristic-identifying means should be permitted, based on results of detection by said disturbance noise signal-detecting means and detection by said rotational speed-detecting means.

12. A vibration/noise control system as claimed in claim 11, wherein said identification permission-determining means includes identification-inhibiting means for inhibiting execution of said identification by said transfer characteristic-identifying means when at least one of conditions is satisfied that rotational speed of said rotating member is higher than a predetermined value, a variation in said rotational speed of said rotating member is larger than a predetermined value, and said disturbance noise signal has a level larger than a predetermined value.

13. A vibration/noise control system as claimed in claim 11, including frequency-discriminating means for discriminating a particular frequency corresponding to a present value of rotational speed of said rotating member, identification signal-preserving means for preserving said identification signal output by said transfer characteristic-identifying means, and identifying frequency-determining means for determining an identifying frequency, based on said particular frequency and said first identification signal preserved in said identification signal-preserving means.

14. A vibration/noise control system as claimed in claim 11, wherein said control signal-generating means comprises an adaptive digital filter having two taps.

15. A vibration/noise control system as claimed in claim 11, wherein said transfer characteristic-identifying means and said control signal-updating means are arranged such that arithmetic operations thereof are carried out by a single control block.

16. A vibration/noise control system as claimed in claim 11, including monitoring means for monitoring an operative state of said control signal-updating means, and wherein said monitoring means inhibits said identification permission-determining means from determining said identification permission when an arithmetic operation of said control signal-updating means is executed, and permits said identification permission-monitoring means to determine said identification permission when said arithmetic operation of said control signal-updating means is not executed.

17. A vibration/noise control system as claimed in any of claims 1 to 10, including frequency-discriminating means for discriminating a particular frequency corresponding to a present value of rotational speed of said rotating member, identification signal-preserving means for preserving said first identification signal output by said transfer characteristic-identifying means, and identifying frequency-determining means for determining an identifying frequency, based on said particular frequency and said first identification signal preserved in said identification signal-preserving means.

18. A vibration/noise control system as claimed in claim 17, wherein said identifying frequency-determining means determines said identifying frequency to a frequency other than said particular frequency and a frequency corresponding to a frequency of said first identification signal preserved in said identification signal-preserving means.

19. A vibration/noise control system as claimed in claim 17, wherein said control signal-generating means comprises an adaptive digital filter having two taps.

20. A vibration/noise control system as claimed in claim 17, wherein said transfer characteristic-identifying means and said control signal-updating means are arranged such that arithmetic operations thereof carried out by a single control block.

21. A vibration/noise control system as claimed in claim 17, including monitoring means for monitoring an operative state of said control signal-updating means, and wherein said monitoring means inhibits said identification permission-determining means from determining said identification permission when an arithmetic operation of said control signal-updating means is executed, and permits said identification permission-monitoring means to determine said identification permission when said arithmetic operation of said control signal-updating means is not executed.

22. A vibration/noise control system as claimed in claim 9 or 10, including identifying amplitude-determining means for determining an amplitude value of said sine wave generated by said sine wave-generating means, based on a sensitivity dynamic factor representative of amplitude of a transfer characteristic of a portion of said at least one vibration/noise transmission path extending between said error signal-detecting means and a predetermined area in said at least one vibration/noise transmission path.

23. A vibration/noise control system as claimed in claim 22, wherein said sensitivity dynamic factor is set such that said amplitude of said transfer characteristic is smaller than an amplitude value of said error signal by a predetermined amount.

24. A vibration/noise control system as claimed in any of claims 1 to 10, wherein said control signal-generating means comprises an adaptive digital filter having two taps.

25. A vibration/noise control system as claimed in claim 24, wherein said transfer characteristic-identifying means and said control signal-updating means are arranged such that arithmetic operations thereof are carried out by a single control block.

26. A vibration/noise control system as claimed in claim 24, including monitoring means for monitoring an operative state of said control signal-updating means, and wherein said monitoring means inhibits said identification permission-determining means from determining said identification permission when an arithmetic operation of said control signal-updating means is executed, and permits said identification permission-monitoring means to determine said identification permission when said arithmetic operation of said control signal-updating means is not executed.

27. A vibration/noise control system as claimed in any of claims 1 to 10, wherein said transfer characteristic-identifying means and said control signal-updating means are arranged such that arithmetic operations thereof are carried out by a single control block.

28. A vibration/noise control system as claimed in claim 27, including monitoring means for monitoring an operative state of said control signal-updating means, and wherein said monitoring means inhibits said identification permission-determining means from determining said identification permission when an arithmetic operation of said control signal-updating means is executed, and permits said identification permission-monitoring means to determine said identification permission when said arithmetic operation of said control signal-updating means is not executed.

29. A vibration/noise control system as claimed in any of claims 1 to 10, including monitoring means for monitoring an operative state of said control signal-updating means, and wherein said monitoring means inhibits said identification permission-determining means from determining said identification permission when an arithmetic operation of said control signal-updating means is executed, and permits said identification permission-monitoring means to determine said identification permission when said arithmetic operation of said control signal-updating means is not executed.

* * * * *